United States Patent
Okiyama et al.

(10) Patent No.: US 8,296,237 B2
(45) Date of Patent: Oct. 23, 2012

(54) RECORDING SYSTEM, FEE CALCULATION DEVICE, AND CONTENT DISTRIBUTION METHOD

(75) Inventors: Toshiki Okiyama, Kawasaki (JP); Akira Akiyama, Kawasaki (JP); Tadamitsu Miyawaki, Kawasaki (JP); Hiroshi Oshino, Ebina (JP); Shinji Akahira, Ebina (JP); Hiroaki Anraku, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 746 days.

(21) Appl. No.: 12/003,729

(22) Filed: Dec. 31, 2007

(65) Prior Publication Data
US 2008/0123857 A1 May 29, 2008

Related U.S. Application Data

(62) Division of application No. 09/572,852, filed on May 18, 2000, now abandoned.

(30) Foreign Application Priority Data

Aug. 24, 1999 (JP) ..................................... 11-236736
Oct. 19, 1999 (JP) ..................................... 11-296406

(51) Int. Cl.
*G06F 21/00* (2006.01)

(52) U.S. Cl. ............ 705/51; 705/52; 705/902; 709/217; 713/175; 713/183; 713/189; 713/193; 726/29; 726/30

(58) Field of Classification Search .............. 705/51–52; 726/29–30
See application file for complete search history.

(56) References Cited

U.S. PATENT DOCUMENTS

| 4,736,422 A | 4/1988 | Mason |
| 5,337,357 A | 8/1994 | Chou et al. |
| 5,586,186 A | 12/1996 | Yuval et al. |

(Continued)

FOREIGN PATENT DOCUMENTS

EP 0676897 A2 10/1995

(Continued)

OTHER PUBLICATIONS

Bush, Harry. "BlowFish 1.60c Beta." Newsgroup posting: Fido7.crypt. Jan. 6, 1997. Web. <http://groups.google.com/group/fido7.crypt/msg/e038bf45455422aa?hl=en&dmode=source>.*

(Continued)

*Primary Examiner* — James A Reagan
*Assistant Examiner* — Calvin Cheung
(74) *Attorney, Agent, or Firm* — Oliff & Berridge, PLC

(57) ABSTRACT

An information service system works to record or print out, at a fee, information contents downloaded from Web servers, information received from facsimiles and information carried on portable storage mediums. The system includes a recording part which records, duplicates and prints out the image of digitized information, an information accumulating part which accumulates information by making relation with users, a user authenticating part which receives user authentication information and authenticates the legitimacy of the user, a fee calculating part which calculates the fee for information recording, a payment reception part which receives the payment of fee by the user, and a management part which manages the charging data and payment data. The recording part records the supplied information only after authentication of user legitimacy and payment of fee by the user. Based on the authentication of user legitimacy and the management of payment of individual users, the recording part can be used commonly among multiple users and the charged information recording service can be run easily.

10 Claims, 26 Drawing Sheets

U.S. PATENT DOCUMENTS

| | | | |
|---|---|---|---|
| 5,629,980 A * | 5/1997 | Stefik et al. | 705/54 |
| 5,634,012 A | 5/1997 | Stefik et al. | |
| 5,646,992 A | 7/1997 | Subler et al. | |
| 5,727,065 A | 3/1998 | Dillon | |
| 5,740,246 A | 4/1998 | Saito | |
| 5,764,762 A | 6/1998 | Kazmierczak et al. | |
| 5,857,020 A | 1/1999 | Peterson, Jr. | |
| 5,910,987 A | 6/1999 | Ginter et al. | |
| 5,917,915 A | 6/1999 | Hirose | |
| 5,970,059 A | 10/1999 | Ahopelto et al. | |
| 5,991,876 A | 11/1999 | Johnson et al. | |
| 5,999,623 A | 12/1999 | Bowman et al. | |
| 6,000,030 A | 12/1999 | Steinberg et al. | |
| 6,005,935 A | 12/1999 | Civanlar | |
| 6,038,316 A | 3/2000 | Dwork et al. | |
| 6,069,957 A | 5/2000 | Richards | |
| 6,125,184 A | 9/2000 | Dillon et al. | |
| 6,141,754 A | 10/2000 | Choy | |
| 6,144,946 A | 11/2000 | Iwamura | |
| 6,185,683 B1 * | 2/2001 | Ginter et al. | 713/176 |
| 6,226,618 B1 * | 5/2001 | Downs et al. | 705/1 |
| 6,289,314 B1 | 9/2001 | Matsuzaki et al. | |
| 6,289,455 B1 | 9/2001 | Kocher et al. | |
| 6,336,189 B1 | 1/2002 | Takeda et al. | |
| 6,343,280 B2 | 1/2002 | Clark | |
| 6,370,143 B1 | 4/2002 | Yamagishi | |
| 6,385,596 B1 | 5/2002 | Wiser et al. | |
| 6,687,833 B1 | 2/2004 | Osborne et al. | |
| 6,832,178 B1 | 12/2004 | Fernandez et al. | |
| 6,971,017 B2 * | 11/2005 | Stringer et al. | 713/182 |
| 7,131,133 B1 | 10/2006 | Kawakura et al. | |
| 7,337,146 B2 * | 2/2008 | Heelan et al. | 705/52 |
| 7,441,121 B2 * | 10/2008 | Cutter et al. | 713/175 |
| 7,509,687 B2 * | 3/2009 | Ofek et al. | 726/30 |
| 7,549,056 B2 * | 6/2009 | Carr | 713/189 |
| 8,074,287 B2 * | 12/2011 | Barde et al. | 726/29 |
| 2001/0051996 A1 * | 12/2001 | Cooper et al. | 709/217 |
| 2001/0053979 A1 * | 12/2001 | Kori | 705/1 |
| 2002/0046174 A1 | 4/2002 | Sugimori | |
| 2002/0112171 A1 * | 8/2002 | Ginter et al. | 713/185 |
| 2004/0107356 A1 * | 6/2004 | Shamoon et al. | 713/193 |
| 2009/0164514 A1 * | 6/2009 | Svendsen et al. | 707/104.1 |

FOREIGN PATENT DOCUMENTS

| | | |
|---|---|---|
| JP | A-8-32530 | 2/1996 |
| JP | A-10-49583 | 2/1998 |
| JP | A-10-161937 | 6/1998 |
| WO | WO 90/02382 | 3/1990 |

OTHER PUBLICATIONS

Microsoft Corporation. Getting Started Microsoft Windows 98 Second Edition. Redmond, WA: Microsoft Corporation, 1999. Print.*

"VeriSign and Gemplus Expand Strategic Relationship; To Develop Joint Smart Card/Digital Certificate Solution for Secure Network Applications." Business Wire. Aug. 26, 1998. Web.*

Polderbits software (www.polderbits.com)

O Connor, Mary Ann, "New Distribution Option for Electronic Publishers", CD-ROM Professional, vol. 7, No. 2, pp. 134-135, Mar. 1994.

Wirbel, Loring, "DirectTV Service Takes to the Air on Time", Electronic Engineering Times, No. 791, Apr. 4, 1994.

Wiedemer, et al "CD-ROM Versus Online: An Economic Analysis for Publishers", CD-ROM Professional, vol. 8, No. 4, pp. 36-42, Apr. 1995.

Nathans, Stephen, "The CD/Online Enablers", CD-ROM Professional, vol. 9, No. 3, pp. 46-56, Mar. 1996.

Rosen, Michele, "IBM Proposes Foundation for Electronic Commerce", MIDRANGE Systems, vol. 9, No. 8, pp. 32, May 24, 1996.

Thyfault, Mary E., "Data From Above", Information Week, No. 584, p. 107, Jun. 17, 1996.

* cited by examiner

FIG.2

DOCUMENT
- PDL, PDF, etc.
- ANIMATION, MUSIC, etc.

DOCUMENT NAME (OPTIONAL)

DOCUMENT SUPPLIER INFORMATION (OPTIONAL)

FEE DATA (OPTIONAL)
- CONTENTS SUPPLY FEE
- NUMBER OF PAGES
- PAGE COLOR INFORMATION, etc.

USER INFORMATION (OPTIONAL)
- USER ID, PASSWORD
- TELEPHONE NUMBER, etc.

FIG.12A

| DECRYPTION INFORMATION 1011 | CONTENTS ID 1012 | SUPPLIER ID 1013 | POINT PER PAGE 1014 | NUMBER OF PAGES 1015 |

SIGNED TICKET 1010 (CUSTOMIZED TO SPECIFIC USER)

FIG.12B

| DECRYPTION INFORMATION 1021 | CONTENTS ID 1022 | SUPPLIER ID 1023 | POINT PER PAGE 1024 | NUMBER OF PAGES 1025 |

UNSIGNED TICKET 1020 (AVAILABLE FOR GENERAL USERS)

FIG.21

| ITEMS | REMARKS |
|---|---|
| ID | ID TO IDENTIFY FEE. ISSUED BY CHARGING DATA PROCESSOR. |
| CONTENTS ID | ID OF CONTENTS USED. ACQUIRED FROM TICKET. |
| SUPPLIER ID | ID OF CONTENTS SUPPLIER. ACQUIRED FROM TICKET. |
| DATE / TIME | DATE AND TIME. ISSUED BY SYSTEM CONTROLLER. |
| NUMBER OF PAGES | NUMBER OF PAGES OF CONTENTS REQUESTED FOR OUTPUT. ACQUIRED FROM TICKET. |
| NUMBER OF PRINTS | NUMBER OF PRINTED SHEETS. ACQUIRED FROM OUTPUT CONTROLLER. |
| N-UP, PAPER SIZE | NUMBER OF PAGES PRINTED ON A SHEET.(NUMBER OF LOGICAL PAGES), SIZE AND LAYOUT DIRECTION OF PRINTOUT. ACQUIRED FROM OUTPUT CONTROLLER. |
| POINTS PER PAGE | NUMBER OF POINTS(OR PRICE) PER PAGE. ACQUIRED FROM TICKET. |
| USER ID | ID OF USER. ACQUIRED FROM TOKEN. |
| ENDING STATUS | OUTPUT RESULT(ERROR INFORMATION). ACQUIRED FROM SYSTEM CONTROLLER. |

FIG.22

| ID | CONTENTS ID | SUPPLIER ID | DATE/TIME | CONTENTS PAGES | PRINTS | N-UP/SIZE | POINTS/PAGE | USER ID | ENDING STATUS |
|---|---|---|---|---|---|---|---|---|---|
| 1 | N1 | N | 1998/08/01 | 5 | 3 | 2 UP | 2 | A | NORMAL |
| 2 | N1 | N | 1998/08/01 | 6 | 3 | 2 UP | 2 | A | NORMAL |
| 3 | N1 | N | 1998/08/02 | 3 | 1 | 2 UP | 2 | A | ABNORMAL |
| ........ | ........ | ........ | ........ | ........ | ........ | ........ | ........ | ........ | ........ |

FIG.28

| CONTENTS ID | SUPPLIER ID | DATE/TIME | PAGES | PRICE |
|---|---|---|---|---|
| N1 | N | 1998/08/01 | 5 | 100 |
| N1 | N | 1998/08/01 | 6 | 120 |
| N1 | N | 1998/08/02 | 2 | 40 |
| ⋮ | ⋮ | ⋮ | ⋮ | ⋮ |

RECORDING SYSTEM, FEE CALCULATION DEVICE, AND CONTENT DISTRIBUTION METHOD

CROSS REFERENCE TO RELATED APPLICATIONS

This application is a divisional application of U.S. patent application Ser. No. 09/572,852, filed May 18, 2000, which is hereby incorporated in its entirety, and is a continuation-in-part of U.S. patent application Ser. No. 09/388,935 filed Sep. 2, 1999, which is hereby incorporated in its entirety.

BACKGROUND OF THE INVENTION

1. Field of the Invention

The present invention relates to a fee-charging information service system for recording, duplicating or printing information, and particularly to a fee-charging information service system for recording information which is delivered or distributed from remote information sources, and charging the user for the service.

More specifically, the present invention relates to a fee-charging information service system for recording information of various kinds including information which is provided from a host terminal connected through a communication medium, information which is sent from a facsimile terminal connected through a telephone line and information which is provided by being carried on a portable storage medium, and charging the user for the service.

The present invention also relates to a method and system for use of fee-charging or free information contents which are distributed or delivered, and particularly to a method and system for use of digital contents capable of protecting the copyright, etc. of a content supplier properly by encrypting the digital information contents, and charging the user for the amount of contents used.

The present invention also relates to a method and system for use of information contents capable of allowing the user to pay for the amount of contents used or allowing the content supplier to pay a commission for the content adopted to be distributed or delivered.

2. Description of the Prior Art

A variety of OA (office automation) equipment has been developed and manufactured vigorously and are prevailing widely in firm offices and laboratories. Particularly, in the modern society where documentation is highly valued, image forming apparatuses capable of duplicating high-resolution and high-quality images are prevailing deeply throughout offices. The image forming apparatus mentioned here include a copying machine which reads original text and reproduces the image of the text on a piece of print paper, a facsimile which outputs image data (facsimile data) sent over public telephone lines such as PSTN (public switched telephone network) and ISDN (integrated services digital network), a printer which prints out computer data (print job) sent via a network such as the LAN (local area network) and the Internet, and a multifunction machine which has two or more of image output functions of these image forming apparatuses.

The image forming apparatus generally includes an image input unit which reads an original text based on optical scanning, an image processor which implements the color coordinate transformation, digital filtering and T/I separation on the input image data, and an image output unit which prints out the processed image data of the original text on a sheet of print paper. The image output unit is based on the scheme of electrophotographic process, for example. The electrophotographic process is the cyclic operations of charging, development and cleaning of a photosensitive member. Specifically, the surface of the photosensitive member is charged uniformly by the charging unit and exposed to a scanning light beam which is modulated by image data so that an electrostatic latent image is formed on it, the latent image is converted into a toner image by a developer, the toner image is transferred onto the print paper and fixed by heat-fusing and pressing, and the printed paper is ejected from the image forming apparatus. The photosensitive member surface is rid of residual toner by the cleaner after the toner image transfer so that it is ready for the next image development process.

Although the need for documentation is expanding constantly, image forming apparatuses of high print quality are still too expensive for individual consumers. Therefore, there is a business that offers charged copy service and facsimile transmission service by installing copy machines and facsimiles in convenience stores and the like. In the copy service, the user is obliged to put coins into the machine (or insert a prepaid money card), and then allowed to have a number of copies within the amount of payment (or within the balance of the money card). In the facsimile transmission service in general, the user first conducts a facsimile sending operation and thereafter pays at the counter in the store for the amount of transmission.

These charged copy service and facsimile transmission service are of benefit to individual consumers in using high-performance and high-quality image processing apparatuses without the expense of purchasing the apparatuses. The store keeper of this service merely installs the apparatuses which users use by themselves, and can collect the fee easily. A secondary advantage is upgrading of store service by installing the apparatuses, thereby attracting customers.

However, there are not yet available, on a commercial basis, charged facsimile reception service, charged printout service for computer data and various information contents received via network, and charged printout service for reception information contents such as computer data carried on CD-ROMS, MOs and other portable storage mediums.

For utilizing the service of copying text by a copy machine or sending text by a facsimile, the user sets the original text and operates the machine directly by oneself. This means that the job is carried out at the same time and in the same location as it is requested. It is, therefore, easy for the store keeper to run the service by easily identifying the user to be charged and without caring for the security of the user's text.

In contrast, for the service of facsimile reception and printout of information which is sent via the network, the job is carried out at a distant time and in a distant location from the time and place where it is requested. For example, the time of facsimile reception is determined by the sending party rather than the receiving user. In utilizing the printout service, one printer is shared by multiple users through a network, and the possibility of simultaneous job requests from the multiple users makes it difficult for the print service provider to identify the users to be charged. Moreover, the service provider must be involved in the security management for received data of individual users.

As the summary of the foregoing, there is a high barrier to be overcome in terms of fee and security management before putting the charged facsimile reception service and information printout service into practice.

The information providing service on the Internet has been improved and expanded significantly in the last several years. Throughout the long history until recent years, information contents have been delivered in the form of printed and bound books, and from now on the content distribution via the network is expected to take the place of printed matters in many cases. The content distribution will promote consumers who are remote from retail facilities and distribution channels to get information contents. It is also beneficial for the content supplier in establishing retailing routes and running the business without having a store with display shelves of commodities.

The user who has received an information content via the network will occasionally need to print out part or all of the received content. However, individual users do not necessarily possess printers which are comparable in print quality with print-bound books, and further, the abovementioned charged content printout service is not yet commercially available. Even after the charged content printout service begins, separate charging at the downloading of an information content and at the printout of the content will be inefficient for the service provider in adjusting accounts.

In addition to the Internet industry, the distribution of digitized contents including articles of newspapers and magazines, audio/video resources and software applications by use of various portable storage mediums including CD-ROMs and distribution systems such as the digital satellite data broadcasting are now beginning. The distribution of information content is expected to increase in the range of field, the quantity of content transaction and the type of mediums.

Although most of content suppliers distribute information contents without charging at present, all the service will be charged sooner or later in the nature of the capitalist economy.

However, digital content suppliers who intend to run the charged content distribution service via the abovementioned distribution routes encounter the following problems:

(1) Distributed digital contents can possibly be copied illegally or tampered with on the part of content providers or distributors, and the copyright of the content supplier is not protected sufficiently.

(2) Efficient and reliable charging systems for digital contents have not been established yet.

(3) Payment systems for an indefinite number of users who use charged digital contents have not been established yet.

(4) Although there are many digital contents requiring small amount payments, charging systems for dealing with small-amount payments efficiently and economically have not been established yet.

(5) The access right to charged digital contents utilizing a password or the like can be acquired only after the prior application and registration, and charged content providing services which is available for an indefinite number of users anytime they want by cash purchases have not been established yet.

(6) Charging data may probably be tampered with.

(7) Users of charged digital contents are obliged to equip their terminals with special hardware, which imposes excessive facility investments on the users.

In order to solve these technical problems, there has been proposed "Data broadcast system and data receiver" in Japanese Published Unexamined Patent Application No. Hei 8-32530. These data broadcast system and data receiver are designed to encrypt data at transmission, decrypt the data at reception, and charge the receiving user for the amount of data decrypted, and will be able to solve (1), (2) and (3) of the abovementioned problems.

For the small-amount payment of the above item (4) many schemes which adopt the prepaid card system have been proposed.

However, the data broadcast system and data receiver described in the abovementioned patent publication No. Hei 8-32530 require the provision of decryption keys for individual data types, and are incapable of devising a countermeasure against tampering with charging data.

The prepaid schemes for small-amount payments do not issue receipts for individual digital contents, and the users must take the whole responsibility for controlling over expense of purchasing the contents. The prepaid schemes are therefore not suited for use in offices where receipts are required for settling accounts in most cases.

SUMMARY OF THE INVENTION

The present invention has been made in view of the above circumstances and provides an excellent fee-charging information service system capable of recording, duplicating or printing information.

The present invention also provides an excellent information service and charging system capable of recording information which is delivered or distributed from remote information sources, and charging the user for the service.

The present invention also provides an excellent information service and charging system capable of recording, duplicating or printing information which is delivered or distributed from information sources, while retaining the security of information even in the case where the information source is distant in terms of time and location, and charging the user for the service accurately.

The present invention also provides an excellent information service and charging system capable of retaining the security of information of each user even in the case where service requests from multiple users are received simultaneously, and charging the user for the service accurately.

The present invention also provides an excellent information service and charging system capable of recording (e.g., printing and storing on a storage medium) information of various kinds including information contents which are provided from a host terminal connected through a transmission medium, information which is sent from a facsimile terminal connected through a public telephone line and information which is provided on a portable storage medium, and charging the user for the service.

The present invention also provides an excellent method and system for use of information contents capable of distributing digital information contents or computer-readable information contents easily, preventing illegal copying and tampering with charging data, and dealing with small amount payments.

The present invention also provides an excellent method and system for use of information contents capable of selling digital information contents to an indefinite number of users (e.g., by cash payment on the spot), instead of having the prior procedure for the application or membership registration.

In view of the foregoing, the present invention is intended to provide an information service and charging system for recording information which is provided from a host terminal connected via a transmission medium such as a LAN (local area network) or the Internet, information which is sent from a facsimile terminal connected through a public telephone line such as the PSTN (public switched telephone network) and ISDN (integrated services digital network) and information which is provided on a portable storage medium, and charging the user for the service. The connection may be of either wired or wireless. The transmission medium can also be ground or satellite broadcasting in which a broadcast station broadcasts information to all receiving terminals. The content distribution scheme can be the push-distribution or pull distribution, for example.

The portable storage medium mentioned in the following is a medium such as a CD-ROM, MO (magneto-optical disc) or DVD (digital versatile disc) which stores data and various information contents in the computer format, and these mediums are used mainly for the transportation and distribution of data among computers. Among these mediums, the CD-ROM, which is inexpensive, is already used extensively by being attached to magazines or the like for the distribution of data and information contents.

The inventive information recording service and charging system can be installed in open spaces such as convenience stores and cooperatives on campuses where many people come for operation of information recording, duplication and printout (in these places, the service providers cannot fully care for the security of information). Most of the information dealt with this system is digitally formatted so that it can be processed by a computer, and the system offers charged service for recording, duplicating or printing the information in a human-legible style or storing the digital information on a storage medium.

The above-mentioned user terminal is installed in an open space of a convenience store and student cooperative store so as to be accessed by users to use information contents. Use of information content signifies printing a content on print paper or copying a computer-readable content onto a portable storage medium such as a CD or an MO.

BRIEF DESCRIPTION OF THE DRAWINGS

Preferred embodiments of the present invention will be described in detail on the followings, wherein:

FIG. 2 is a diagram showing the data structure of capsulized files;

FIGS. 12A and 12B are diagrams showing the data structure of tickets, of which FIG. 12A is of a user-signed ticket 1010 and FIG. 12B is of a user-unsigned ticket 1020;

FIG. 21 is a table showing the items of charging data;

FIG. 22 is a table showing specific examples of charging data;

FIG. 28 is a table showing specific examples of the result of totalizing process.

DESCRIPTION OF THE PREFERRED EMBODIMENTS

First Embodiment

Figure 1:
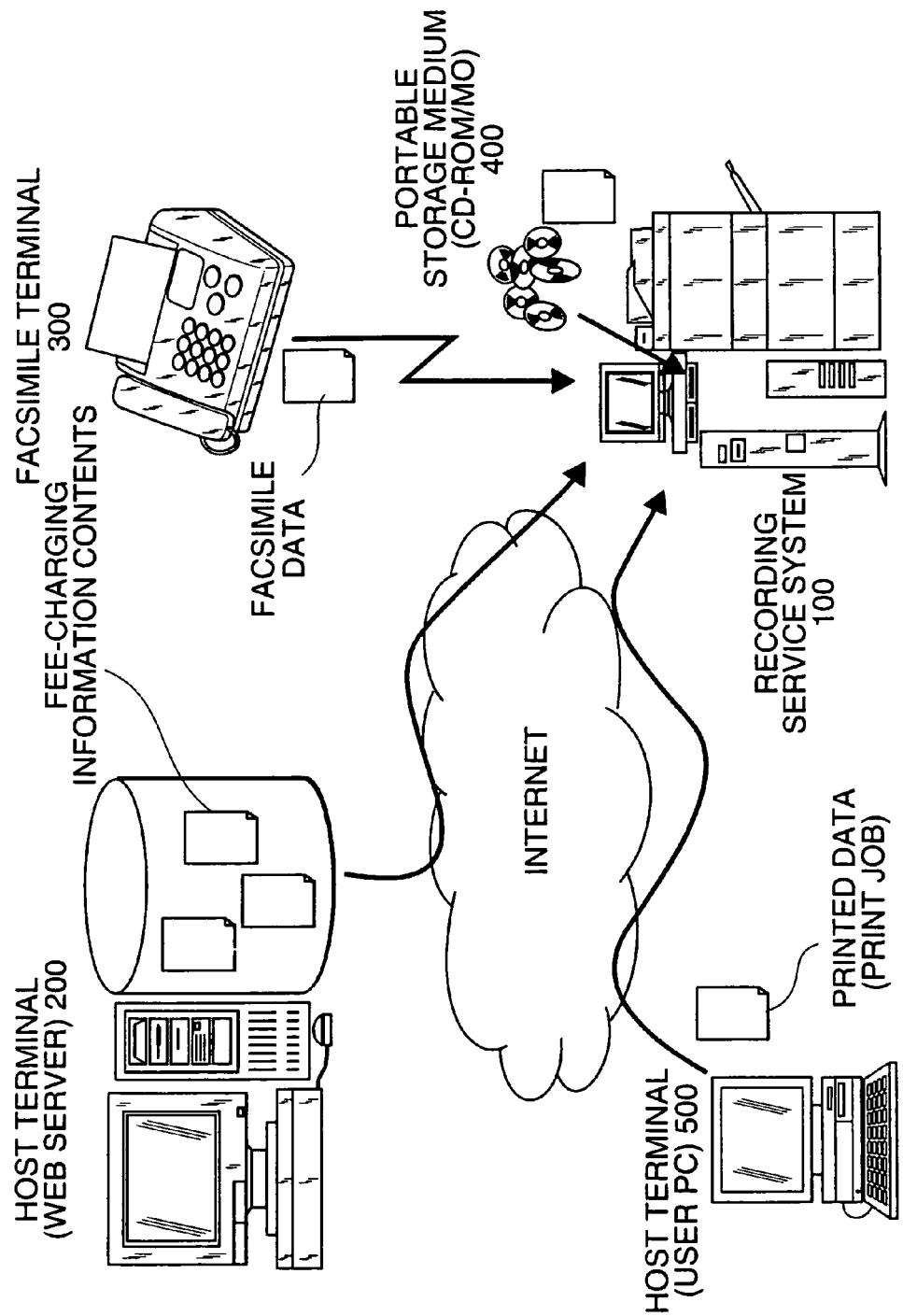
FIG. 1 is a schematic diagram showing the configuration of the information recording service and charging system based on a first embodiment of this invention.

FIG. 1 shows the configuration of the information recording service and its charging system based on the first embodiment of this invention.

Information recording mentioned in this embodiment signifies the printout of visual information retrieved from digital computer data on print paper and the printout of facsimile data sent over a public telephone line on the print paper after demodulation into the image, for example.

The information recording service and charging of this invention is carried out by the recording service system 100 shown in the figure. This recording service system 100 is installed in an open space such as a convenience store or a cooperative on campus where many people come for operation of information recording, duplication and printout (in this place, the service provider cannot fully care for the security of information).

The recording service system 100 of this embodiment is an image forming apparatus which reproduces a visual image on the print paper, and more preferably it is a multifunction machine having multiple image reproducing functions including a copy function for duplicating an original image on the print paper based on the scanning of the original text, a printing function for printing computer data in response to a request from an external host terminal, and a facsimile function for transacting image information with an external facsimile terminal over the public telephone line.

Although the recording service system 100 can perform the information recording service and charging as a stand-alone system placed in a store, it is more preferably connected with a switched telephone line such as the PSTN (public switched telephone network) or ISDN (integrated services digital network), or a distribution computing network such as a LAN (local area network) and the Internet.

For example, the recording service system 100 is connected with multiple host terminals 200, 500 . . . via computer networks such as the LAN and the Internet. The host terminal mentioned here signifies generically a computer system operating as a server or client in the network. Accordingly, the recording service system 100 is one of the host terminals operating in the network, and it can operate as a printing server in the network or a Web server or client in the Internet.

Each host terminal is based on a personal computer which is compatible with, for example, IBM's PC/AT (personal computer/advanced technology) or its successors, and can make document files in predetermined formats by using application programs of word processor, spreadsheet, etc. In the network, each host terminal can issue a document print request to the recording service system 100 as file server. In this case, the requesting host terminal sends a capsulized file (to be explained later) of the document, with user information, etc. being attached thereto, to the recording service system 100. The user information mentioned here is any of the user ID number or password which is useful to identify the user's account (user right). The recording service system 100 which has received the capsulized file spools (simultaneous peripheral operation online) it as a print job temporarily.

In the case of the Internet network, the recording service system 100 and other host terminals 200, 500 . . . are connected with each other in compliance with the TCP/IP (transmission control protocol/Internet protocol), for example. In the Internet industry, it is known that several information content supply businesses typified by WWW (world wide web) are already running. In the WWW information space, there are numerous information contents which are recognizable by the URL (uniform resource locator). Individual servers and clients in the WWW information space can make access to these information contents in accordance with the HTTP (hyper text transfer protocol).

The host terminal 200 in the example of FIG. 1 is a computer system operating as a Web server which provides information contents in the WWW information space. Another terminal, host terminal 500, is a PC (personal computer) used by a general user, and it operates as a Web client which requests the access to information contents. The Web server 200 provides fee-charging or free information contents. The fee for the information service may be constant, or may vary depending on the quality of content and the quantity of data as in the case of the example shown in FIG. 1.

The recording service system 100 of this embodiment can also work as a Web client connected to the network, thereby making access to information contents of the Web server 200. (It is obviously possible for the recording service system 100 to function solely as a Web server thereby to provide its information contents in the Internet. This matter is not a direct concern to the present invention, and further explanation is omitted.)

In this embodiment, the Web clients (inclusive of the host terminals 500, etc. and the system 100 itself) can issue print requests for information contents existing in the WWW information space to the recording service system 100. The Web server 200, which is the sending party of information contents, sends a capsulized file of the information content, with user information being included, to the recording service system 100. The user information is to identify the user's account uniquely (same as above). On receiving the capsulized file, the recording service system 100 spools it temporarily as a print job.

The recording service system 100 is also connected through a telephone line with a facsimile terminal 300, from which it can receive facsimile data to be recorded. In this embodiment, the sending facsimile terminal 300 sends facsimile data, with user information being attached thereto, in the form of a capsulized file to the recording service system 100. The recording service system 100 spools the received capsulized file temporarily. The user information is to identify the user's account uniquely (same as above), and it can be, for example, the telephone number of the sending facsimile terminal in this case.

The scheme of facsimile communication is arbitrary for the present invention, and it can be either the G3 facsimile stated as ITU (international telecommunication union)-T T.4, or the G4 facsimile stated as ITU-T T. 5, T6, for example.

The recording service system 100 of this embodiment is equipped with a recording/reproduction device for an external storage medium such as a CD-ROM and MO, as will be explained in detail later. The user of recording service can put a storage medium in the recording service system 100 and request the printout of data stored on it. The recording service system 100 reads the data file out of the storage medium, attaches the user information to it to be capsulized, and spools the file as a print job temporarily. The user information is to reveal the user's account uniquely (same as above).

The recording service system 100 of this embodiment includes a charging device and user information input device, as will be explained in detail later.

The charging device has a function similar to that of a coin box or cash dispenser. The charging device of this embodiment calculates the fee for the printout (or saving to a storage medium) of information implemented by the recording service system 100, prompts the service requesting user to pay the fee, and collects the money paid by the user. In addition to receiving coins and bank notes, the charging device may have the ability of accepting other manners of payment including settling accounts with a prepaid card, direct drawing from a bank account with use of a credit card and on-the-spot direct drawing from a bank account with use of a debit card. The charging device may be designed to sort charging data and payment data for individual users. The recording service system 100 may allow the user to pay the fee at cash registers (POS terminals) in the same store as the system 100 is installed, instead of using the charging device.

The charging device may be designed to log the content registration commission to be charged to each content supplier so that the total commission is charged to the supplier afterward. In this case, the content registration commission is subtracted from the fee charged to the content service user, and the user can enjoy recording service at a reduced price. The imposition of at least part of recording service fee on the part of content supplier is based on the business convention in which the content user is conceivably paying in terms of referencing an information content of advertisement which is brought to the system by the content supplier.

The content registration commission mentioned here signifies a commission imposed on the content supplier for registration of contents to be presented which are mainly advertisements and for the free printing by users that the content supplier intends to pay on the user's behalf. In this case, the content recording service provider (e.g., the copy machine keeper) charges the content supplier for, as a commission, at least part of the cost of service such as printing, so that the provider can offer the service to user at a lower price, thereby promoting the access to the store.

The user information input device receives user information for user authentication, namely identification and verification of the account of the service requesting user. The user authentication information can be entered from an IC card, for example, and in this case this device is an IC card reader. Alternatively, the user authentication/identification information can be an ID code or password of an alphanumeric character string, or the user's telephone number, and in these cases the user information input device can be substituted by the computer keyboard and display through which the user enters one's authentication/identification information manually.

The recording service system 100 verifies the user information which has been entered by the user on the user information input device and, upon proving the user's authenticity, extracts print jobs relevant to the user based on the user information from among the spooled print jobs. The recording service system 100 receives a capsulized file which contains the user information, as mentioned previously, and it can implement a filtering process for the print jobs by taking out the user information from the file.

The extracted print jobs are itemized in terms of icons for example, and displayed on the display device. The user can select an intended print job by hitting the keyboard or using such a pointing device as a mouse device or a touch panel.

The charging device calculates the fee for the print service in response to the selection of a print job by the user, and indicates the fee to the user. The fee may be indicated digitally on an LED panel, or in a dialog on a computer's GUI (graphical user interface) screen, or by an audio output. Alternatively, the fee may be printed on a print paper of a certain form (e.g., bill).

The user can pay the fee directly to the charging device. The charging device may have the ability of handling account settlement with prepaid cards, direct drawing from a bank account with use of credit cards and on-the-spot direct drawing from a bank account with use of debit cards, in addition to coins and bank notes, as mentioned previously. The user may be allowed to pay the fee at cash registers (POS terminals) in the same store in accordance with the bill issued by the charging device.

After the user's payment is confirmed, the recording operation such as the selected print job is carried out. The system may be designed to make prints only within the amount of user's payment.

Recording of information by the recording service system 100 may include other recording scheme in addition to the printout of information on the print paper. For example, digitally or computer-readably formatted information may be recorded onto a portable storage medium such as CD-R (compact disc-recordable), MO (magneto-optical disc), or DVD (digital versatile disc) or on the hard disk of the requesting host terminal.

Data contents spooled in the recording service system 100 are capsulized together with user information, as mentioned previously. FIG. 2 shows the data structure of a capsulized file.

The document field contains the document body as the object of recording. Recording mentioned here signifies the duplication of document on the print paper, as well as recording of digital document data intact onto CD-R, MO, DVD, etc. The document body may have a printable format such as the PDL (page description language) or PDF (portable document format), or may retain the format of mono-medium data such as of a still picture (GIF, JPEG or BMP), animation pictures (MPEG) or sound (AIFF, WAV or ACC). The document may be encrypted data in an encryption method which can be decrypted by the recording service system 100.

The PDL (page description language) is a description language used to instruct print images to a page printer. The PDF (portable document format) is a file format which enables display and printing on the document viewer Acrobat developed by Adobe Systems Inc., the U.S.A.

The document name field contains the name of document body. The document name is used when print jobs filtered in accordance with the user information are listed for example. The document name may be substituted by the date and time of reception of the document by the recording service system 100.

The document supplier information field contains the supplier's name of the document body. In the case where the document body is an information content sent from the Web server 200, the server name, content supplier's name or content creator's name is put in this field. In the case where the information supply fee (or a fee equal to it) is imposed on the document body, the charging device connected to the recording service system 100 can collect the fee for recording service and information supply fee from the user and pay the information supply fee to the document supplier afterward.

The fee information field contains information used for the calculation of the fee for document recording service (e.g., charging rate). For example, in the case of document printout by the recording service system 100, the number of document pages and color information will be needed for the fee calculation (the price will differ between a monochrome page and a multi-color page). In case of a charged document, i.e., a document with the imposition of information supply fee, the content supply fee is needed for the fee calculation. In the case where the content supplier pays a content registration commission depending on the frequency of use of the content, the charging rate for the registration commission is also put in this field.

The user information field contains information used to identify or filter jobs for each user spooled in the recording service system 100 and also perform authentication of the user. The user information which can be used includes authentication/identification information such as ID code, password and telephone number (in the case of facsimile communication particularly).

In FIG. 2, for the data fields of the titles, with label "Optional" being appended, the entry of the field is arbitrary. Although these fields are used to identify the user, authenticate the user, calculate the fee and divide the fee, they may be omitted so that the load of file transfer is reduced.

Figure 3:
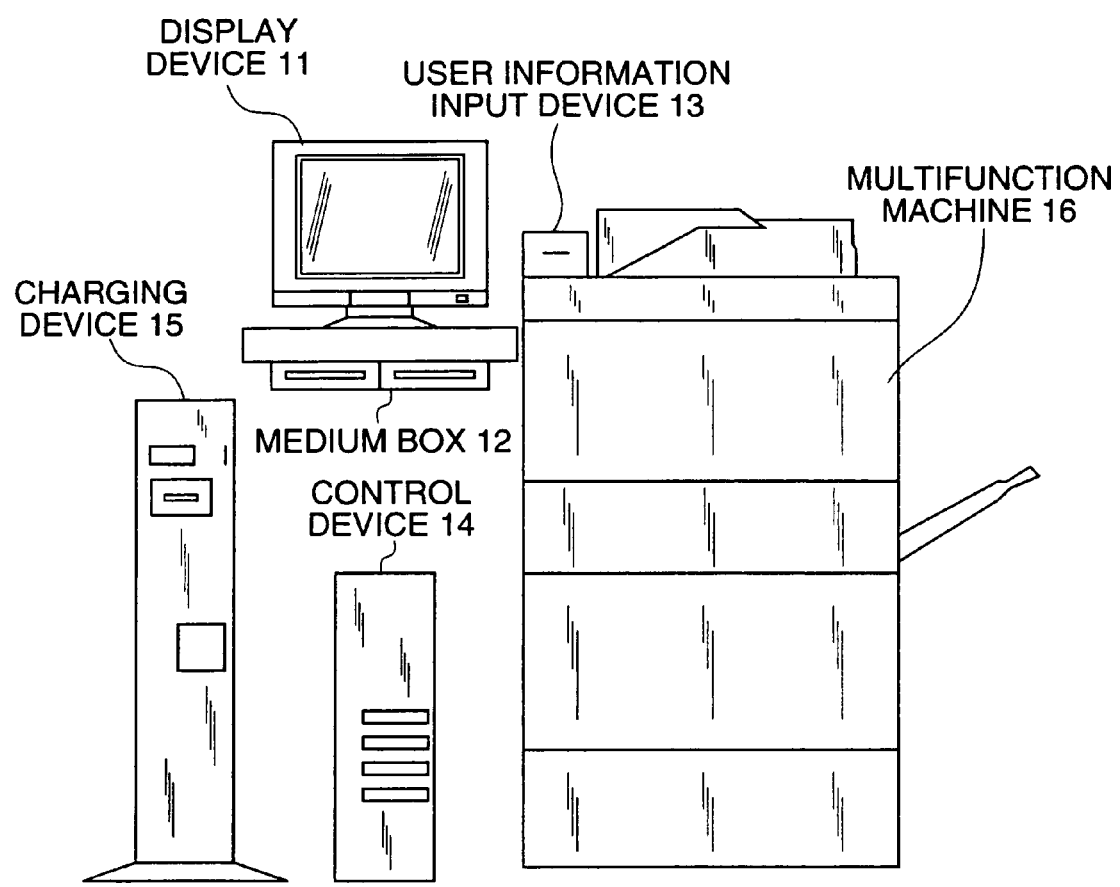
FIG. 3 is a diagram showing the external view of the recording service system 100 based on the first embodiment of this invention.

FIG. 3 shows the external view of the recording service system 100 of this embodiment. The system 100 includes a display device 11, a medium box 12, a user information input device 13, a control device 14, a charging device 15, and a multifunction machine 16.

The control device 14 is a device which controls the operation of the recording service system 100 from the input of recording request to the distribution of record. The control device 14 of this embodiment works as a host terminal in a network and also works as a print server having the SPOOL (simultaneous peripheral operation online) function which temporarily spools documents and information contents which are requested by users to record (these are normally capsulized as shown in FIG. 2). The control device 14 can be built as a general-purpose computer system which is generally called "workstation" or "personal computer", for example. Examples of the control device 14 include personal computers compatible with the IBM's PC/AT and its successors.

The display device 11, which can be a peripheral unit of the control device 14 as a computer system, achieves the GUI (graphical user interface) environment on its screen.

The display device 11 of this embodiment can be used, for example, for displaying the jobs extracted from the SPOOL in accordance with the user information and for displaying the recording service fee calculated by the charging device 15 and the amount of money paid by the user. Command input by the user for job selection or the like is generally done by use of the keyboard or a pointing device such as a mouse device. By provision of a transparent touch-panel on the screen of the display device 11, the user can perform an easier and intuitive input operation.

The medium box 12 incorporates one or more medium drive units for reading out and/or writing data on portable storage mediums such as CD-ROM, MO (magneto-optical discs) and DVD (digital versatile discs). It is connected as a peripheral unit of the control device 14 as a computer system in compliance with the SCSI (small computer system interface) standard for example.

Computer application programs, for example, which are run by the control device 14 can be distributed and transported among multiple computer systems on these portable storage mediums. A document or information content to be recorded can be fed to the recording service system 100 by setting the CD-ROM or MO storing the content on the drive unit in the medium box 12. It is also possible to designate a portable storage medium placed in the medium box 12 as an output medium for a job spooled in the recording service system 100.

The user information input device 13 is a device which is used to enter user information. In this embodiment, it is an IC card reader for reading out user information recorded on the IC card. As user information, user authentication/identification information such as the user's ID code, password and telephone number can be used, for example. Otherwise, user information may be entered with the keyboard and screen of the display device 11, for example, instead of using an IC card.

The user information received by the user information input device 13 is used by the charging device 15 for the management of charging data and payment data of individual users and for extracting spooled jobs.

The charging device 15 is a device which calculates the fee for the recording service, displays the fee for the service, and receives the payment from the user. The charging device 15 of this embodiment is capable of managing charging data and payment data separately for each user.

Indication of fee by the charging device 15 is performed digitally on an LED panel or in a dialog on a display screen, or in an audio output. Alternatively, the fee may be printed on a bill of a certain form.

In addition to coins and bank notes, the charging device 15 may be capable of accepting other manners of payment including settling accounts with prepaid cards, direct drawing from a bank account with use of credit cards and on-the-spot direct drawing from a bank account with use of debit cards. Apart from payment through the charging device 15, the user may be allowed to pay the printed bill at a register (POS terminal) in the same store. Alternatively, the user information, charging data and content supplier information are logged on a non-volatile recording device (e.g., a hard disk, flash memory, SDRAM (static DRAM) in the charging device 15 or control device 14 so that users are allowed to pay later.

The multifunction machine 16 is a device which has two or more image output functions out of the function of copy machine which reads an original text and reproduces the image of the text on the print paper, the function of facsimile which prints image data sent over a telephone line such as the PSTN (public switched telephone network) and ISDN (integrated services digital network), and the function of printer which prints computer data sent via the LAN (local area network) or the Internet.

In this embodiment, the multifunction machine 16 works as a printer for printing out print jobs sent from the Web server 200 and host terminal 500 and/or a facsimile which outputs the image of facsimile data sent from the facsimile terminal 300.

The multifunction machine 16 may be connected to the LAN directly by its own NIC (network interface card) (not shown), in addition to the connection to the LAN via the control device 14. In this case, the multifunction machine 16 can receive documents in a printable format such as PDL and PDF directly from the LAN and print the documents without intervention of the control device 14.

The multifunction machine 16 is made up of an image reading unit which optically reads an original text, an image processing unit which converts the image data into the print signal, an image output unit which produces the image of the signal on the print paper, and a paper transport unit which carries the print paper in the unit (not shown in the figure). The multifunction machine 16 may be equipped with accessories such as paper feeding and output trays for stacking paper before and after printing and an automatic document feeder (ADF) which feeds pages of document sequentially. It is possible to use an existing multi-task apparatus for the multifunction machine 16. The internal configuration of the unit is not a direct concern to the present invention, and further explanation is omitted.

Figure 4:
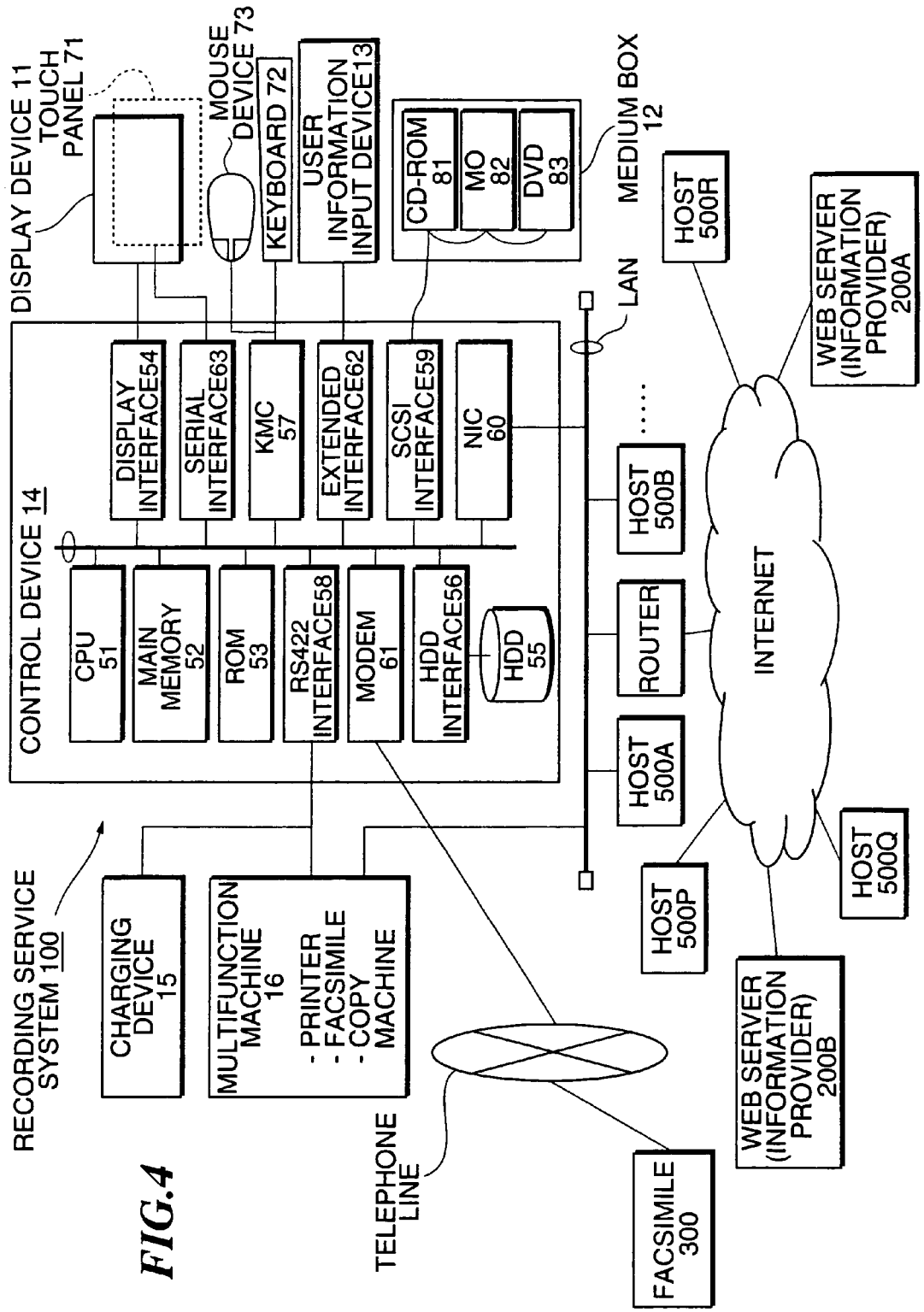
FIG. 4 is a diagram showing schematically the internal hardware configuration of the recording service system 100.

FIG. 4 shows schematically the internal hardware configuration of the control device 14 which controls the recording service system 100. As mentioned previously, the control device 14 is based in its system architecture on an existing general-purpose computer such as the PC/AT. Specifically, the control device 14 is made up of a printed wiring board called "mother board" (not shown) on which main components are mounted, peripheral units connected by cables to the connectors (not shown) on the wiring board, and various adapter cards (interface cards) plugged to one or more bus slots on the wiring board. The following explains individual functional sections of the system 100.

The CPU (central processing unit) 51 is the main controller which generally controls the whole operation of the control device 14 and recording service system 100, and it runs various application programs in the operational environment provided by the operating system (OS). Examples of OS include UNIX and Windows NT of Microsoft Inc., USA. Application programs are as follows:

(1) A program spools information contents for which requests of recording have been received sent from other host terminals via the network and facsimile data sent from facsimile terminals 300.

(2) A program performs authentication of users based on the user information provided by the user information input device 13.

(3) A program controls the management of charging data and payment data of individual users by the charging device 15 and controls the print operation of the multifunction machine 16. For example, it receives the charging rate data of recording service, content supply fee or a content registration commission, number of pages and color page information, calculates the total fee including the supply fee (or the supply fee minus a registration commission) of the content and print service fee, and displays or prints the calculation result for the payment of fee.

The main memory 52 is a rewritable volatile memory used to hold a program run by the CPU 51 and work data of the program, and it is generally made up of several DRAM (dynamic RAM) chips. The ROM (read only memory) 53 is a read-only memory which permanently stores the self-diagnostic program (POST) which is run at turning-on the power of the control device 14 and the basic input/output system (BIOS) program for the hardware operation. The ROM 53 may be an EEPROM (electrically erasable and programmable ROM) which is electrically erasable and rewritable.

The CPU 51 is connected with each unit in the device 14 through the bus 65. The bus 65 is a common signal path including an address bus, data bus and control bus, and it is specifically the PCI (peripheral component interconnect) bus for example.

The display interface 54 is an interface controller which controls the screen display of the display device 11 in accordance with the rendering command from the CPU 51, and it has a frame memory (not shown) for storing rendering data temporarily. For putting the present invention into practice desirably, the display interface 54 has preferably the rendering ability equal to or better than VGA (video graphics array) or higher, e.g., SVGA (super video graphics array) or XGA (extended graphics array).

The hard disk drive (HDD) 55 is an external storage device for storing programs and data in the form of files of a certain format, and it has a relatively large storage capacity of the order of several GBs to several tens of GBs. In this embodiment, the hard disk drive 55 is used to spool, i.e., store temporarily, information contents, etc.

The HDD 55 is connected to the bus 65 by way of the hard disk interface 56. The interface standard adopted to connect the hard disk drive to the computer system 14 is IDE (integrated drive electronics), for example.

The keyboard/mouse controller (KMC) 57 is a specialized controller for dealing with user input such as key input from the keyboard 72 and coordinate input with such a pointing device as the mouse device 73.

In this embodiment, the touch-panel 71 is included as a pointing device in addition to the mouse device 73. The touch-panel 71 is provided on the screen of the display device 11, and it enables the user to enter commands intuitively by viewing icons or menu displayed on the GUI (graphical user interface) screen. The touch-panel 71 is connected to the control device 14 by way of the serial input/output interface 63.

As mentioned previously, the recording service system 100 of this embodiment has the charging device 15 for charging the fee and receiving the payment, and the multifunction machine 16 for content recording.

These charging device 15 and multifunction machine 16 are connected to the computer system 14 through the RS-422 interface 58. The RS (recommended standard)-422 is a standard pertinent to the electrical characteristics of high-speed interface of data communication stated by the EIA (Electronic Industries Alliance) of the U.S.A.

The recording service system 100 has the medium box 12 (mentioned previously) as an information entry of recording service and as another recording device. In this embodiment, the medium box 12 incorporates one or more medium driving units such as a CD-ROM (or CD-R) drive 81, an MO (magneto-optical disc) drive 82 or a DVD (digital versatile disc) drive 83, for reading out and/or writing data on portable storage mediums. The SCSI (small computer system interface) 59 can daisy-chain up to seven medium drives 81, 82 ... of this type simultaneously.

In the recording service operation of information contents distributed by unit of portable storage mediums, the information contents read out of the mediums are capsulized (refer to FIG. 2) and spooled as jobs on the HDD 55.

The network interface card (NIC) 60 is a device for connecting the computer system 14 to the external network. In the example shown in FIG. 4, the NIC 60 connects the control device 14 to a LAN (local area network) segment. In this LAN segment, the control device 14 can work as a printing server. The multifunction machine 16 can be connected directly to the LAN segment, as mentioned previously, by being equipped with its own NIC. In this case, the multifunction machine 16 can receive documents in a printable format such as PDL and PDF and print the documents directly without intervention of the control device 14.

One host terminal in the LAN segment is a router, and the system 100 is connected to the Internet via the router.

A number of host terminals exist in the LAN and Internet. One of the host terminals is the Web server 200 which provides fee-charging or free information contents publicly. Each information content in the Internet can be identified by the URL, and can be accessed in accordance with the HTTP protocol. The Web server 200 is not necessarily obliged to store information contents to be provided on its own local disks, and it may take out information contents for providing from other servers (content servers) in the network.

The Web server 200 capsulizes information contents and sends the contents to the recording service system 100 (refer to FIG. 2). The control device 14 spools the received information contents as jobs on the HDD 55.

Some other host terminals 500A, 500B ... work as clients. These clients 500A ..., as Web clients for example, request the provision of HTML (hyper text markup language) or other information contents to the Web server 200, and also issue document print requests to the control device 14, while transferring capsulized information contents to the recording service system 100 (refer to FIG. 2). The control device 14 spools the received information contents on the HDD 55.

The modem 61 is a device for modulating and demodulating transmission data on an analog telephone line, and it can be connected to the facsimile terminal 300 via the switching facility over the telephone line. The control device 14 spools the received facsimile data as jobs on the HDD 55.

The extended device interface 62 is a device for connecting the IC card reader as the user information input device to the computer system 14. The user information entered to the IC card reader is transferred to the CPU 51 and used for the user authentication process and filtering of spooled jobs.

Figure 5:
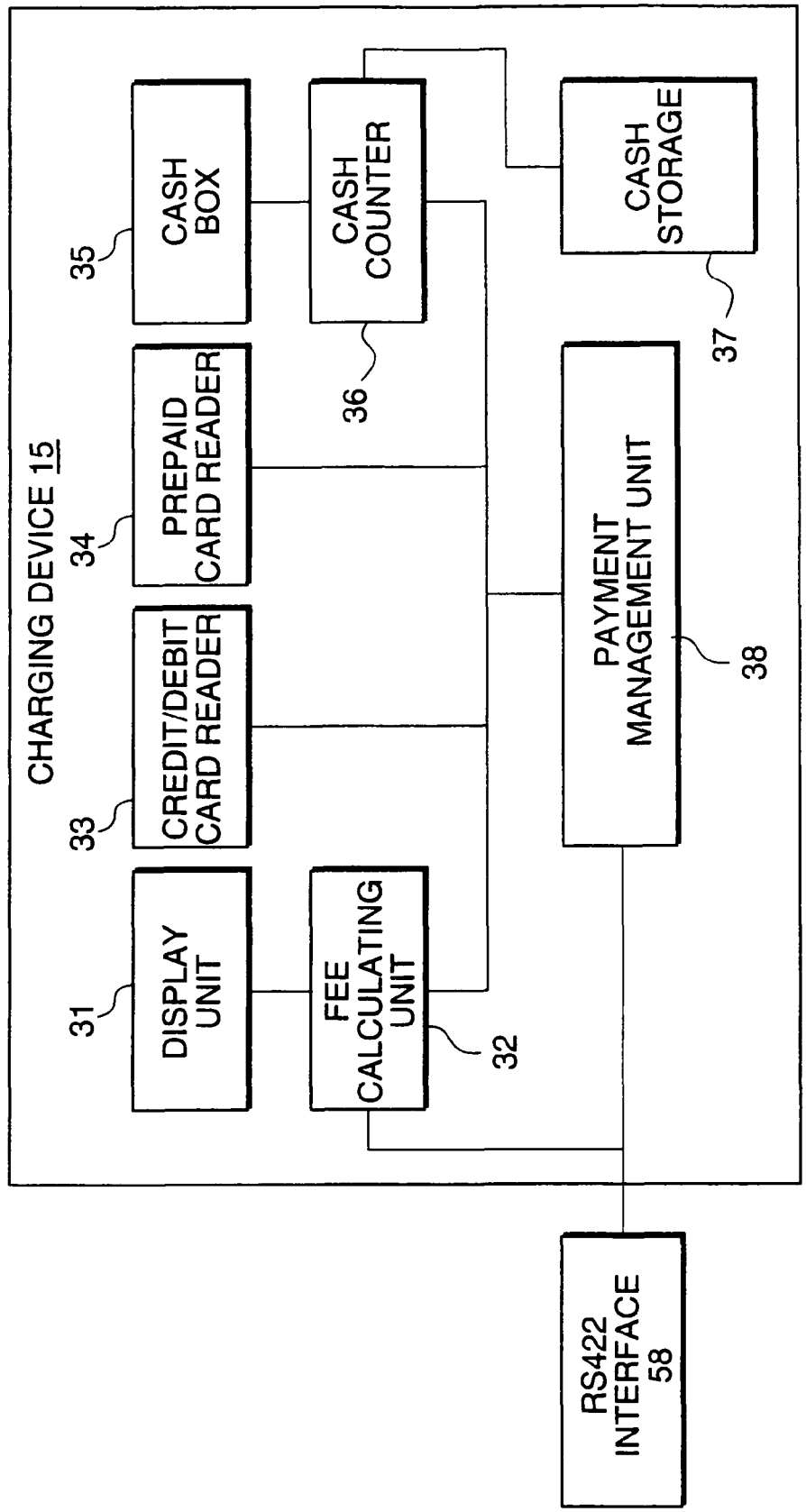
FIG. 5 is a diagram showing schematically the internal configuration of the charging device 15.

FIG. 5 shows the internal configuration of the charging device 15. The charging device 15 is a device which charges the user and stores paid money, and it is called "coin box" or "cash dispenser". The charging device 15 is connected to the control device 14 through the RS-422 interface 58 (mentioned previously) as shown in the figure.

The fee calculating unit 32 holds the charging rate data of the recording service such as the print price per page. It receives the supply fee (or a registration commission) of the content, number of pages and color information, calculates the total fee including the content supply fee and print service fee (or the total fee minus the registration commission), and sends the calculated fee to the display unit 31 and payment management unit 38.

The display unit 31 is a unit for indicating the fee to the user, and it is an LED panel for example. In addition to the visual information of fee, the fee may be notified to the user by the audio output or printed output on a bill of a certain form.

The user may pay the fee by putting coins or bank notes into the cash box 35. In this case, the cash counter 36 counts the amount of entered cash, informs the amount to the payment management unit 38, and stores the cash in the cash storage 37.

Alternatively, the user can pay the fee in other manners such as settling accounts with a prepaid card, direct drawing from a bank account with use of a credit card and on-the-spot direct drawing from a bank account with use of a debit card. In these cases, the user puts the prepaid card into the prepaid card reader 34 or puts the credit card into the credit/debit card reader 33. These card readers 34 and 33 inform the payment data to the payment management unit 38.

The payment management unit 38 manages the charging data calculated by the fee calculating unit 32 and payment data provided by the cash box 35 and card readers 34 and 33 separately for each user. The payment data of each user is sent to the control device 14 via the RS-422 interface 58.

The fee calculating unit 32 and payment management unit 38 performing intricate calculation may not necessarily be incorporated in the charging device 15, and the calculation may be processed by use of the computation resources in the control device 14, namely, the calculation ability of CPU 51. The charging device 15 may not have the display unit 31, and the fee may be displayed on the GUI screen of the display device 11. In this case, the display unit 31 can be so simple as to merely display the amount of payment digitally.

Figure 6:
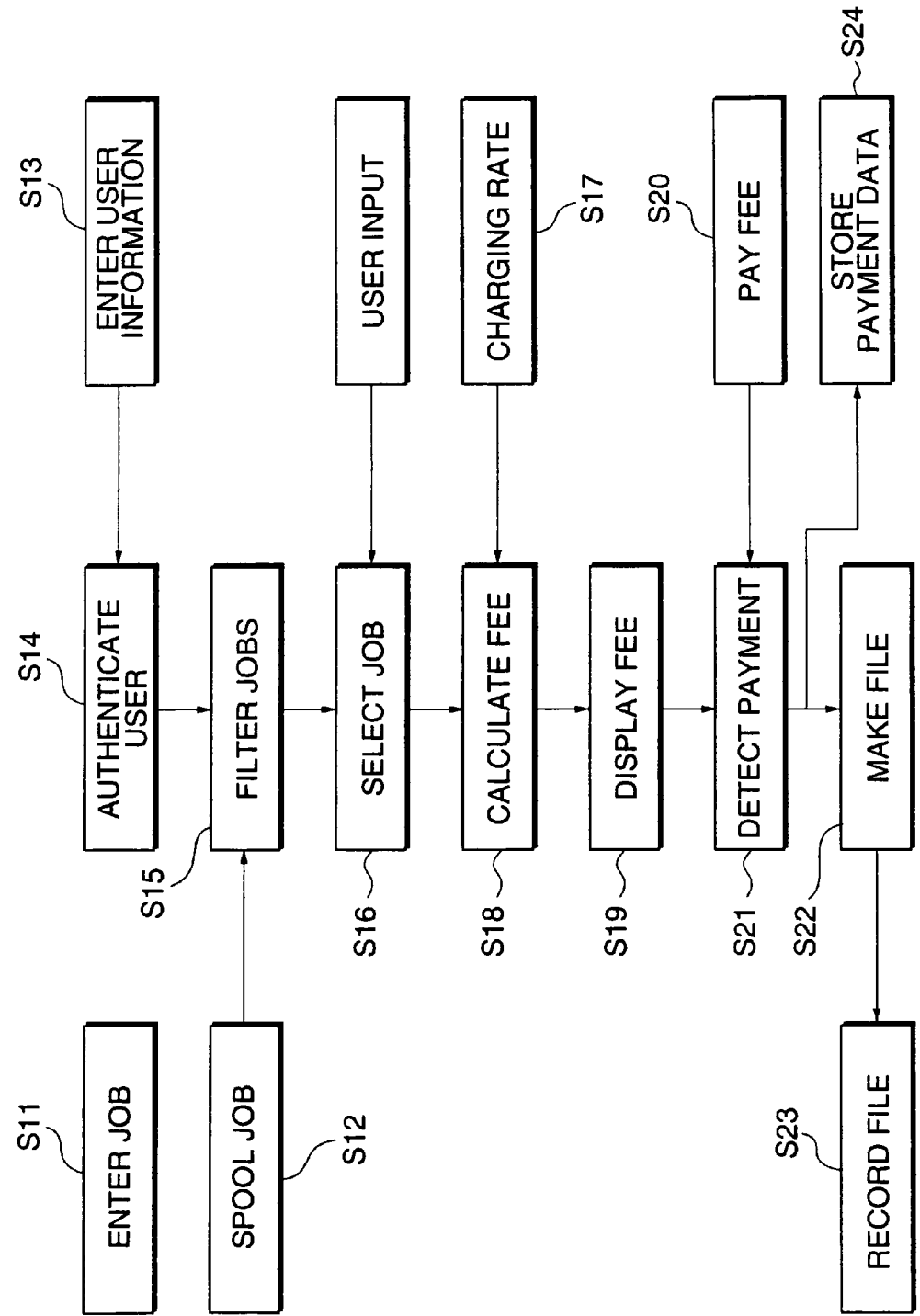
FIG. 6 is a flow chart showing the processing procedure of the charged recording service performed by the recording service system 100.

FIG. 6 shows the processing procedure of the charged recording service performed by the recording service system 100. The operation of the recording service system 100 will be explained with reference to FIG. 6.

The recording service system 100 performs job input in the manner of file reception, which can include reception of an information content from the Web server 200, reception of a print request from the host terminal (client) 500, reception of facsimile data from the facsimile terminal 300, and reading of an information content to be recorded out of the portable storage medium 400 (step S11). The received job is a capsulized file with the attachment of user information etc. (refer to FIG. 2). At the commencement of file reception, the system 100 sends a status message "reserved" to the file sending terminal. The file sending terminal can inquire the recording service system 100 of the status of the job at an arbitrary timing.

On completion of file reception, the received file is spooled on the hard disk 55 or the like (step S12). Then, the job has a status of "received".

The sending user of the job enters one's user information (step S13). Entry of user information is the user's operation of putting the IC card into the user information input device 13 or keying the user ID code or password on the keyboard and display screen 11.

The recording service system 100 verifies the job sending user, i.e., verifies the legitimacy of the user's account (user right) based on the entered user information (step S14).

Following the successful user authentication, the system 100 filters jobs relevant to the job sending user by searching the spooled jobs in accordance with the entered user information (step S15). Spooled jobs are capsulized files (refer to FIG. 2). The system 100 filters the relevant jobs by analyzing the contents of capsules by making reference to the attached user information.

The jobs extracted by filtering are displayed in the form of icons, for example, on the GUI screen of the display device 11. The user can select an intended job to be recorded by pointing the icon on the touch-panel 71 or with the mouse device 73 (step S16).

The charging device 15 (coin box or cash dispenser) has a record of the charging rate of page unit print service and the like. The capsulized job file has a record of the number of pages, color page information and charging data including the information content supply fee or registration commission (refer to FIG. 2). The charging device 15 acquires the charging data and charging rate data from the file (step S17), and calculates the total fee for the job, i.e., document recording service, based on these pieces of information (step S18).

The calculated fee is displayed on the display unit of the charging device 15 or the screen of the display device 11, thereby prompting the user to pay the fee to the charging device 15 (step S19). The payment may be prompted by an audio output instead of display, or it may be printed on a bill of a certain form.

The user who watches the displayed fee puts coins or bank notes equal to the amount of the fee into the charging device 15 (step S20). The user may pay the fee by use of a prepaid card, a credit card or a debit card, instead of using cash. Alternatively, the user may pay the fee at cash registers (POS terminals) in the same store, instead of using the charging device 15.

The charging device 15 counts the amount of cash paid thereby to confirm the payment of the fee (step S21).

On detecting the payment (either in cash or by card), the system 100 takes out the document from the job file, and produces a file for recording (step S22). For example, in the case where the recording service is to print out the document, it produces a PDL (page description language) file. The resulting file is transferred to the recording part, which then carries out the recording operation (step S23). In this case of printout service, the recording unit is the multifunction machine 16. In the case where the recording service is to store document data onto a storage medium such as a CD-R or MO, the recording unit is the medium box 12.

The charging data (user information, document name, document supplier, fee, etc.) may be stored for backup on the hard disk 55 (or in a non-volatile memory such as SDRAM or flash memory (not shown)) before, during or after the transfer of the produced file to the recording part (step S24). More than one medium may be used for the backup of charging data.

Figure 7:
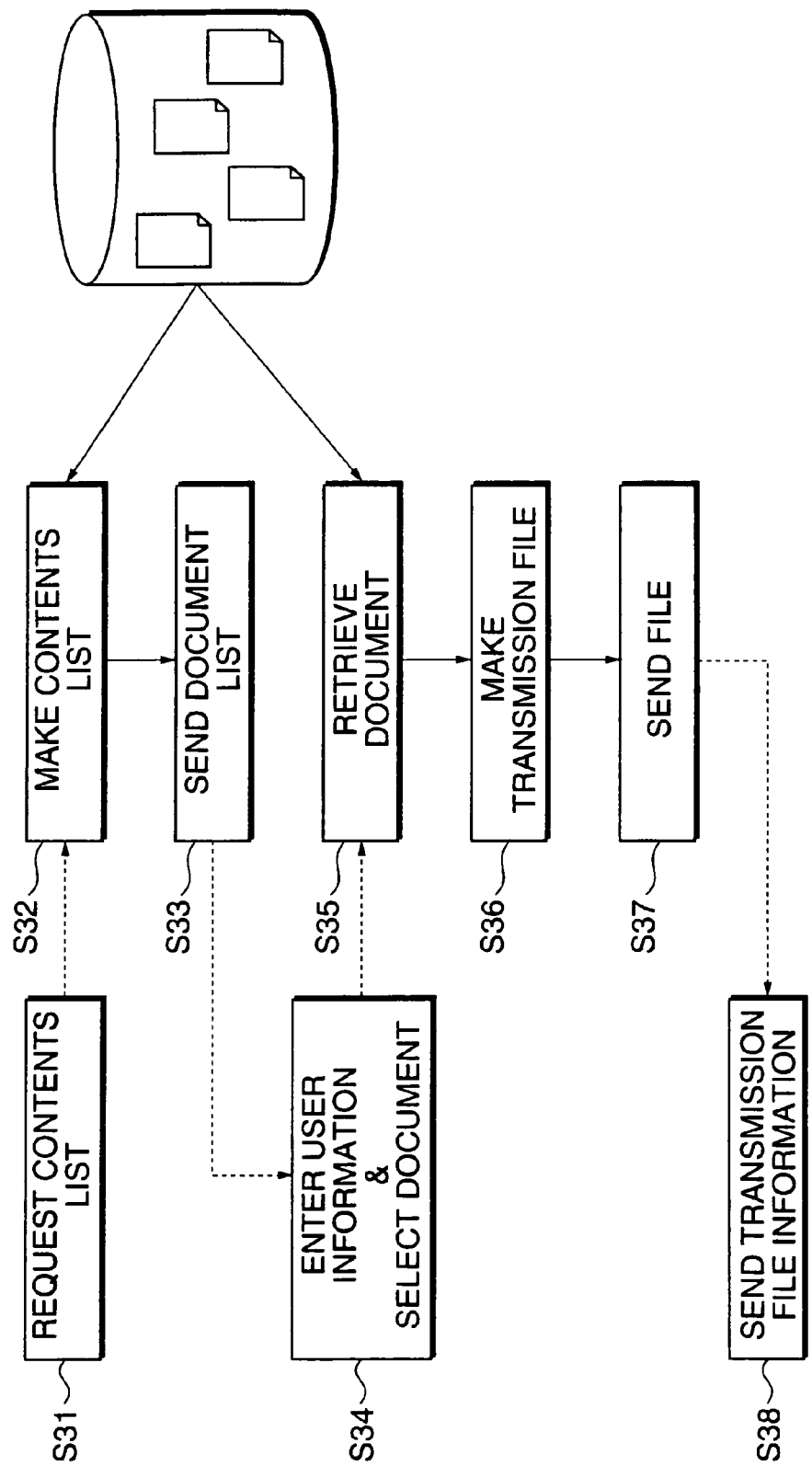
FIG. 7 is a flow chart showing the processing procedure of the Web server 200 and recording service system 100 of the case of service where information contents provided by the Web server 200 are obtained via the Internet and recorded.
Figure 8:
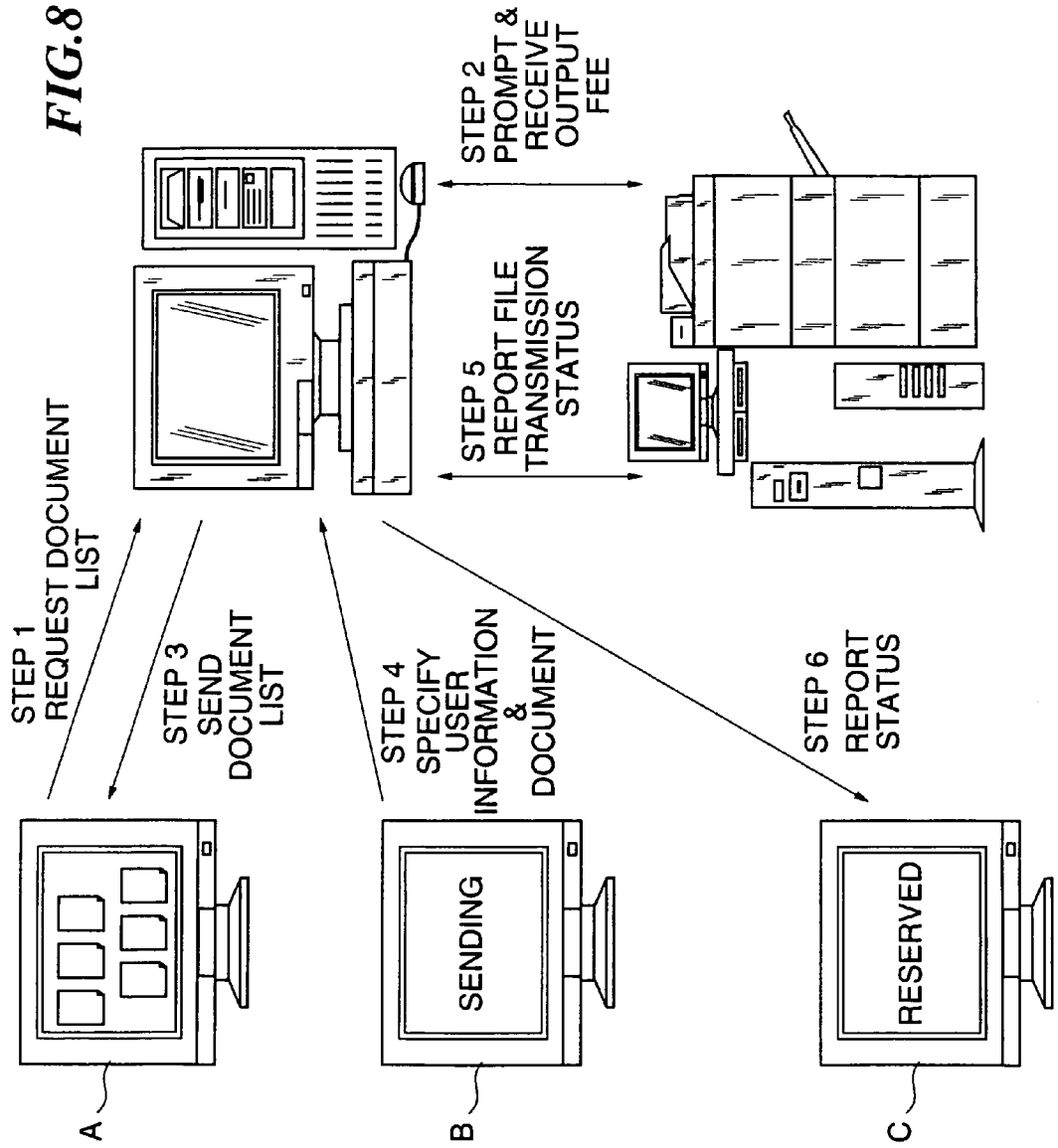
FIG. 8 is a diagram showing the processing procedure of the Web server 200 and recording service system 100 of the case of service where information contents supplied by the Web server 200 are introduced via the Internet and recorded.

FIG. 7 and FIG. 8 show the processing procedure of the Web server 200 and recording service system 100 in the case of introducing an information content provided by the Web server 200 via the Internet and carrying out the recording service for the content. The processing procedure will be explained with reference to these figures.

A client user requests the Web server 200 to display a list of available contents (step S31). This request is entered by the user by writing the URL (uniform resource locator) in the Web browser box, or selecting the anchor, with the URL being embedded, on the WWW page screen, and sent as an HTTP request message to the Web server 200. The request of content list-up can be done either on the display device 11 of the recording service system 100 or on the display screen of the user's host terminal 500.

In response to the request, the Web server 200 produces a list of information contents that the Web server 200 can offer (step S32). Contents available from the Web server 200 are not limited to those possessed by the Web server 200, but the Web server 200 can use resources of other content servers connected via the network.

The list of information contents includes a list of IDs which can be used to identify each content, and it may further include charging data for the recording of each content. The Web server 200 can request the recording service system 100 to send charging rate data for the calculation process of charging data. The fee for content recording mentioned here includes the supply fee (or the supply fee minus a registration commission) of the content and the fee for recording service. The information supply fee and the supply commission, which are determined by the content supplier, may be constant for all contents or may vary among contents. The fee for recording service is the fee for the recording process by the recording service system 100, and it is calculated based on charging rate data of page unit price, the number of pages of the content, etc.

Listing of available contents is not a standard function of the WWW (world wide web) server, and therefore the Web server 200 may use the CGI (common gateway interface) to call the external program (CGI application program) and commit the listing of contents to the program. Alternatively, the Web server 200 may statically preserve in advance the HTML content of the list of available contents instead of dynamically producing the list on demand. Alternatively, the recording service system 100 may receive in advance the list of available contents presented by the Web server 200 and displays it to the client user directly.

The Web server 200 sends the list of available contents as an HTTP response to the client (step S33). In this embodiment, the destination of content list is not the host terminal 500 of the client, but it is the system 100 which implements the recording of the content. Subsequent recording service can be directly performed at a location for downloading. It is obviously possible to allow the client host terminal 500 to download the list of available information contents, while retaining the effectiveness of the present invention.

It is assumed that the client user has already authenticated his/her own legitimacy as a user of the recording service system 100 based on one's IC card or the like.

The recording service system 100 displays for the verified user the received list of available contents in the form of icons on the screen of the display device 11 (refer to A of FIG. 8). This display may includes the fee for recording service of each content in addition to the ID of each content.

The user can directly select an intended content, such as a content to be printed, on the displayed available content list, by use of the mouse device 73 or touch-panel 71.

In response to the user's content selecting action, the recording service system 100 sends a content providing request, which is the ID of the selected content with user information attached, to the Web server 200 (step S34). The system 100 may display a message "transmitting" or "sending" as shown by B of FIG. 8 on the screen of the display device 11 during the time after the transmission of content providing request until the reception of content from the Web server 200.

The Web server 200 obtains the content in response to the content providing request (step S35). It capsulizes the content in the form shown in FIG. 2 by using the user information attached to the content providing request (step S36).

Subsequently, the Web server 200 sends the produced content file to the recording service system 100 (step S37). The recording service system 100 returns the status message "reserved", and it notifies the status "reserved" to the client on the screen of the display device 11.

The recording service system 100, which has received the content file from the Web server 200, spools it temporarily. On confirming the user's payment by cash or card, the system 100 carries out the recording service by printing the content on the print paper or recording the content on a portable storage medium.

Second Embodiment

Next, the system configuration and operation of the content distribution method based on the second embodiment of this invention will be explained with reference to the drawings.

Figure 9:
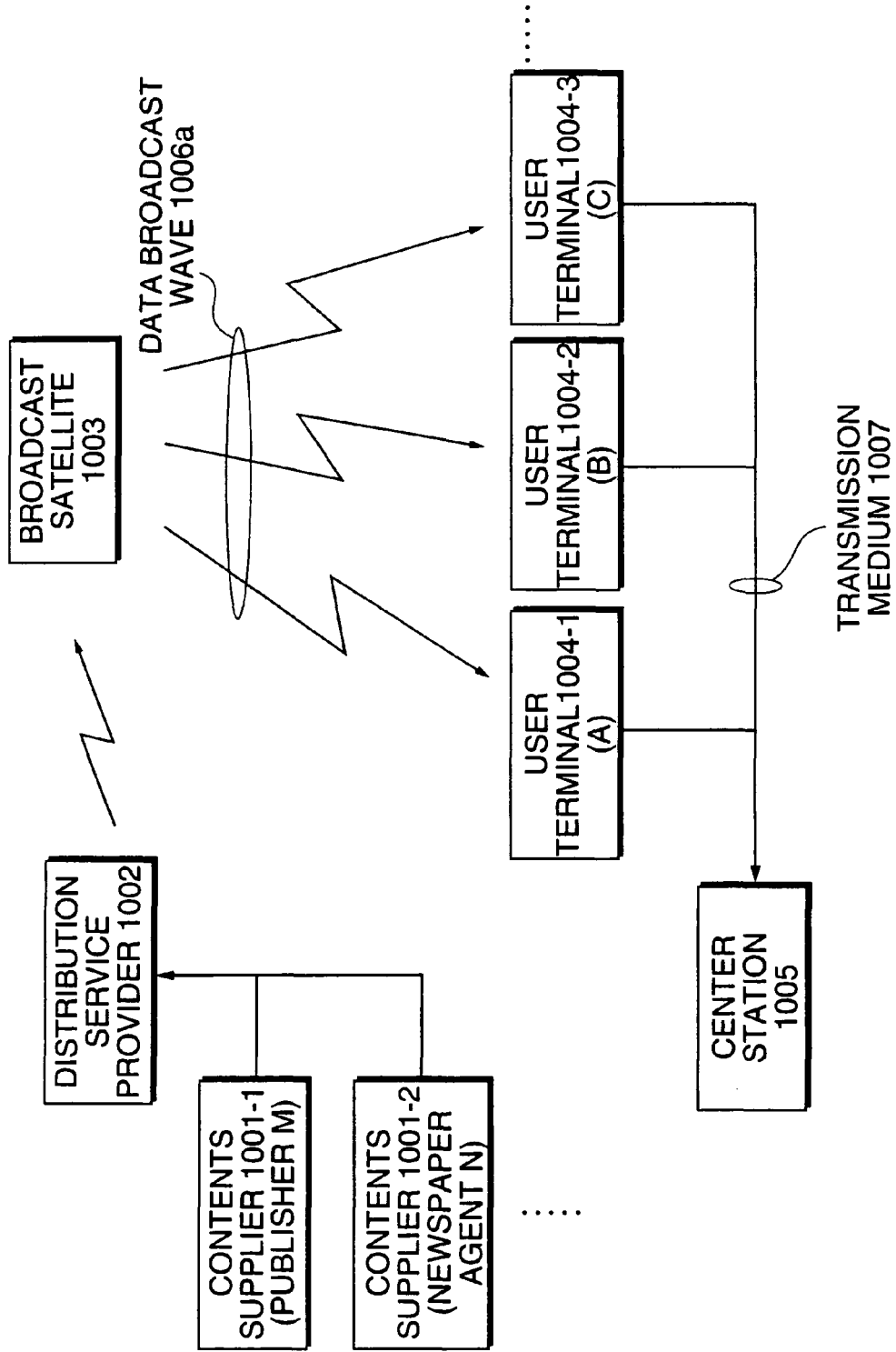
FIG. 9 is a diagram showing schematically an example of the configuration of the content distribution/delivery system 1000 based on a second embodiment of this invention.

FIG. 9 shows by block diagram an example of the configuration of a content distribution/delivery system 1000 based on the second embodiment of the present invention. The distribution/delivery system 1000 includes content suppliers 1000-1, 1000-2 . . . , a distribution service provider 1002, a broadcast satellite 1003 by which contents are delivered, user terminals 1004-1, 1004-2 . . . , and a center station 1005.

The user terminals 1004 . . . are unidirectionally connected to the broadcast satellite 1003 by a satellite data transmission wave 1006*a*. The satellite transmission wave may be replaced with a ground wave. The user terminals 1004 . . . are bidirectionally connected to the center station 1005 by a transmission medium 1007. The transmission medium 1007 mentioned here includes a network such as the LAN and Internet, as well as a public telephone network such as the PSTN and ISDN, of either wired or wireless connection.

In the example shown in FIG. 9, the content suppliers 1001 . . . are dealers who supply digital information contents or computer-readable information contents including articles of newspapers and magazines, audio/video resources and computer programs.

The distribution service provider 1002 is a broadcast station, for example, who uploads contents supplied by the content suppliers 1001 . . . into the broadcast satellite 1003 through the process of a predetermined encryption scheme, and broadcasts the contents from the broadcast satellite 1003 to the user terminals 1004 . . . . The distribution of information contents is based on a predetermined distribution plan. In Japan, the ARIB (Association of Radio Industries and Businesses) is working to standardize the digital satellite data broadcast.

The user terminals 1004 are terminal units which provide, at a fee, the utility for the use of information contents received in the form of broadcast data, and these terminals are installed in open spaces such as convenience stores and cooperatives on campuses, for example, where many people gather.

The use of contents mentioned here signifies the printout on the print paper and storing on storage mediums such as CD-Rs and MOs in the form of computer-readable data, and the user terminal 1004 is equivalent to the recording service system 100 described in the first embodiment.

The center station 1005 collects charging data from the user terminals 1004 . . . via the transmission medium 1007 and totalizes them, and administers the fee information about the information content providing.

Figure 10:
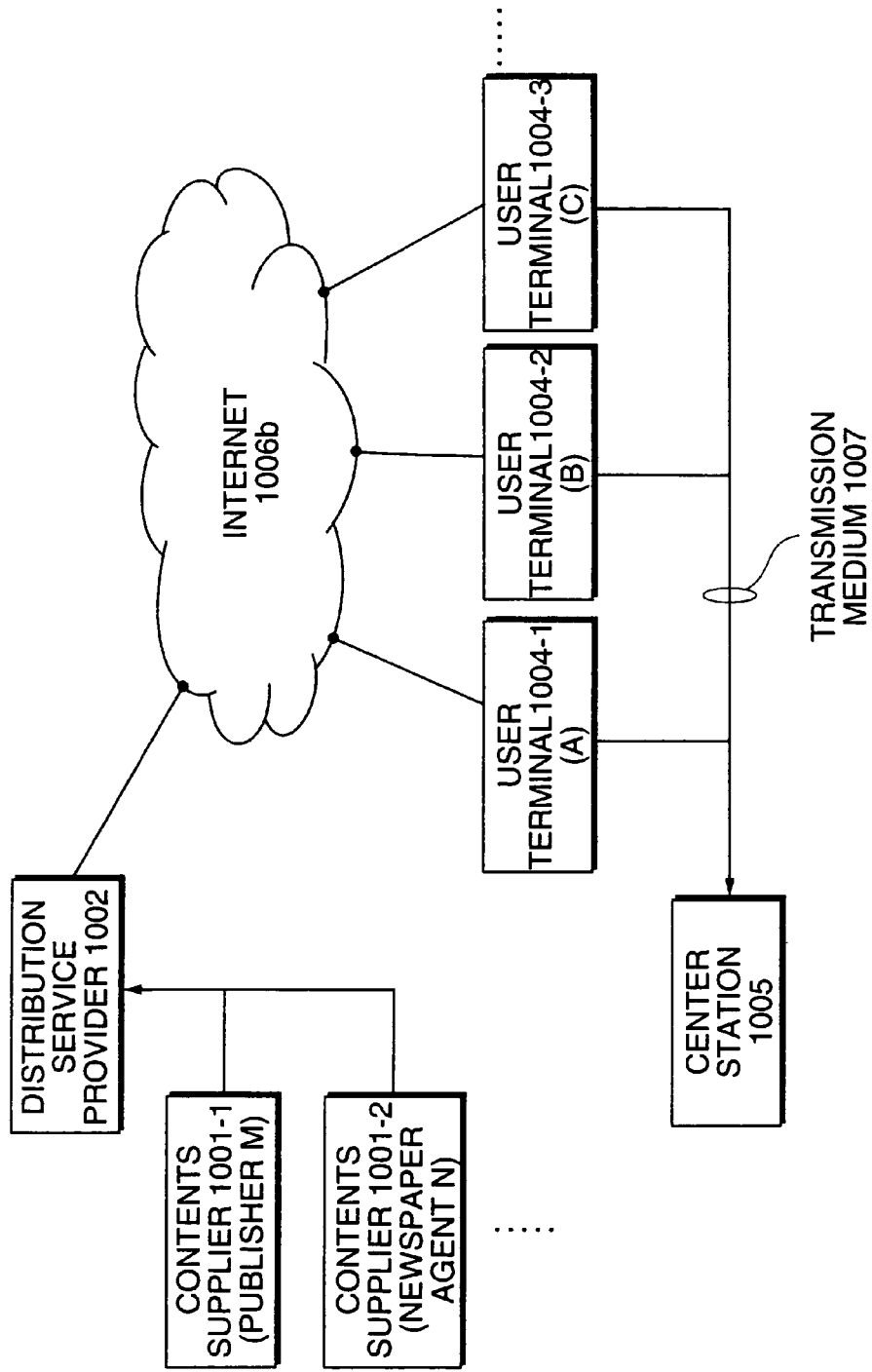
FIG. 10 is a diagram showing schematically another example of the configuration of the content distribution/delivery system 1000 based on the second embodiment of this invention.

FIG. 10 shows by block diagram another example of the configuration of the content distribution/delivery system 1000 based on the second embodiment of the present invention. In the figure, the distribution/delivery system 1000 includes content suppliers 1000-1, 1000-2 . . . , a distribution service provider 1002, user terminals 1004-1, 1004-2 . . . , and a center station 1005. This system configuration differs from the previous example of FIG. 9 in that the user terminals 1004 are connected to the distribution service provider 1002 via a network such as the LAN and Internet. The user terminals 1004 . . . are connected to the center station 1005 by a bidirectional transmission medium 1007 (same as above).

In the example shown in FIG. 10, the content suppliers 1001 . . . create and supply digital information contents or computer-readable information contents including articles of newspapers and magazines, audio/video resources and computer programs.

The distribution service provider 1002 of this example is in TCP/IP connection to a network such as the Internet 1006b, and it also constitutes its own Web site. In the Web site, the provider 1002 operates content providing business worldwide by encrypting contents supplied by the content suppliers 1000 . . . . The distribution service provider 1002 carries out the push-distribution or pull-distribution of information contents based on a predetermined distribution schedule.

The user terminals 1004 are terminal devices which provide, at a fee, the utility for the use of information contents received in the form of data broadcast, and these terminals are installed in open spaces such as convenience stores and cooperatives on campuses for example (same as above). The use of contents mentioned here signifies the printout on print paper and storing on storage mediums in the form of computer-readable data, and the user terminal 1004 is equivalent to the recording service system 100 described in the first embodiment.

In the example shown in FIG. 10, each user terminal 1004 . . . also works as a Web client in TCP/IP connection to a network such as the Internet, and it can download information contents from the Web site run by the distribution service provider 1002 for the use of general users (printout on the print paper and storing on storage mediums). It is also possible obviously for the user terminal 1004 to display various supplied publicly-accessible information content by using the Web browser.

The center station 1005 collects charging data from the user terminals 1004 . . . over the transmission medium 1007 and totalizes them, and administers the fee information about the information content supply.

Figure 11:
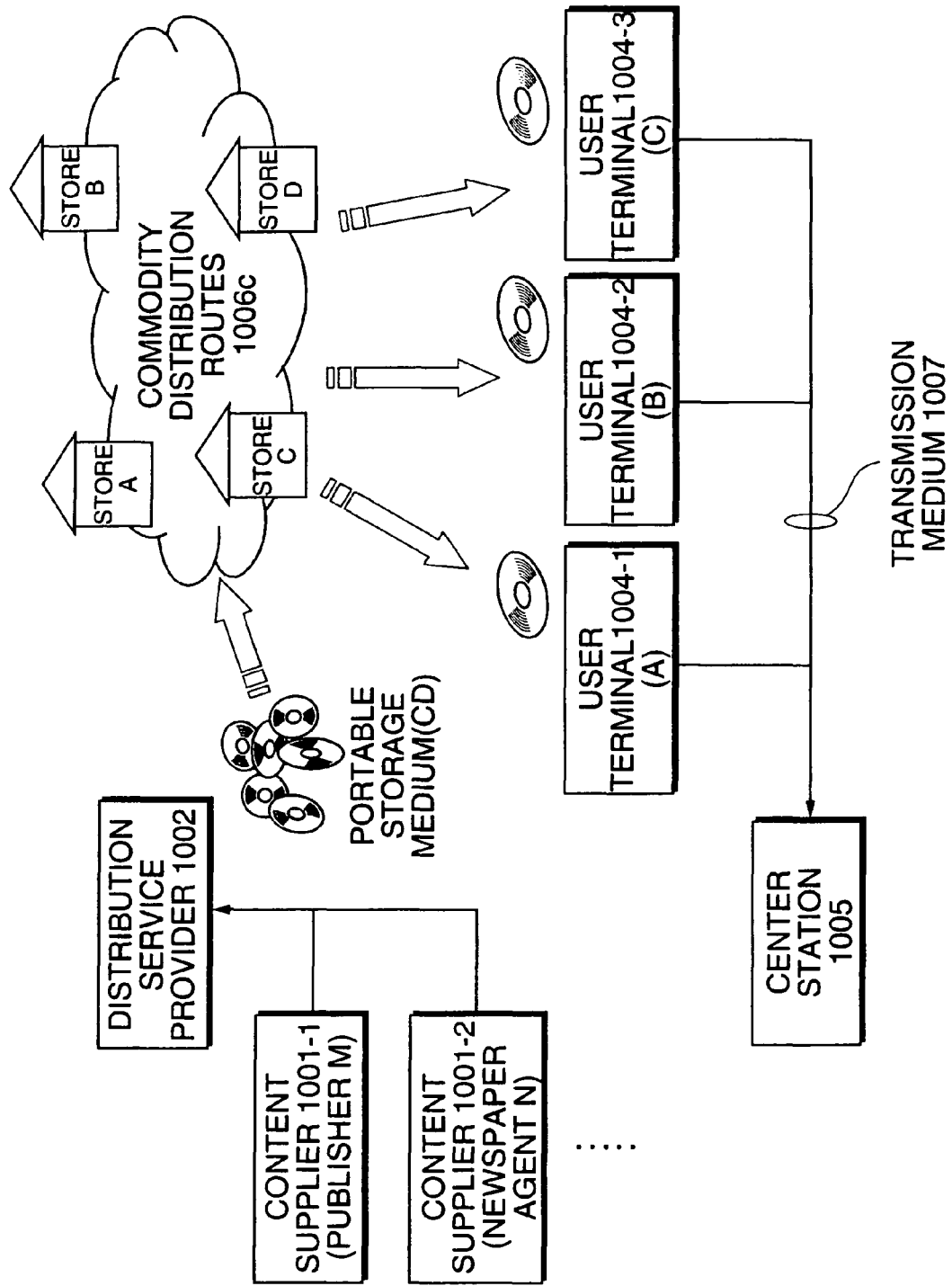
FIG. 11 is a diagram showing schematically still another example of the configuration of the content distribution/delivery system 1000 based on the second embodiment of this invention.
Figure 13:
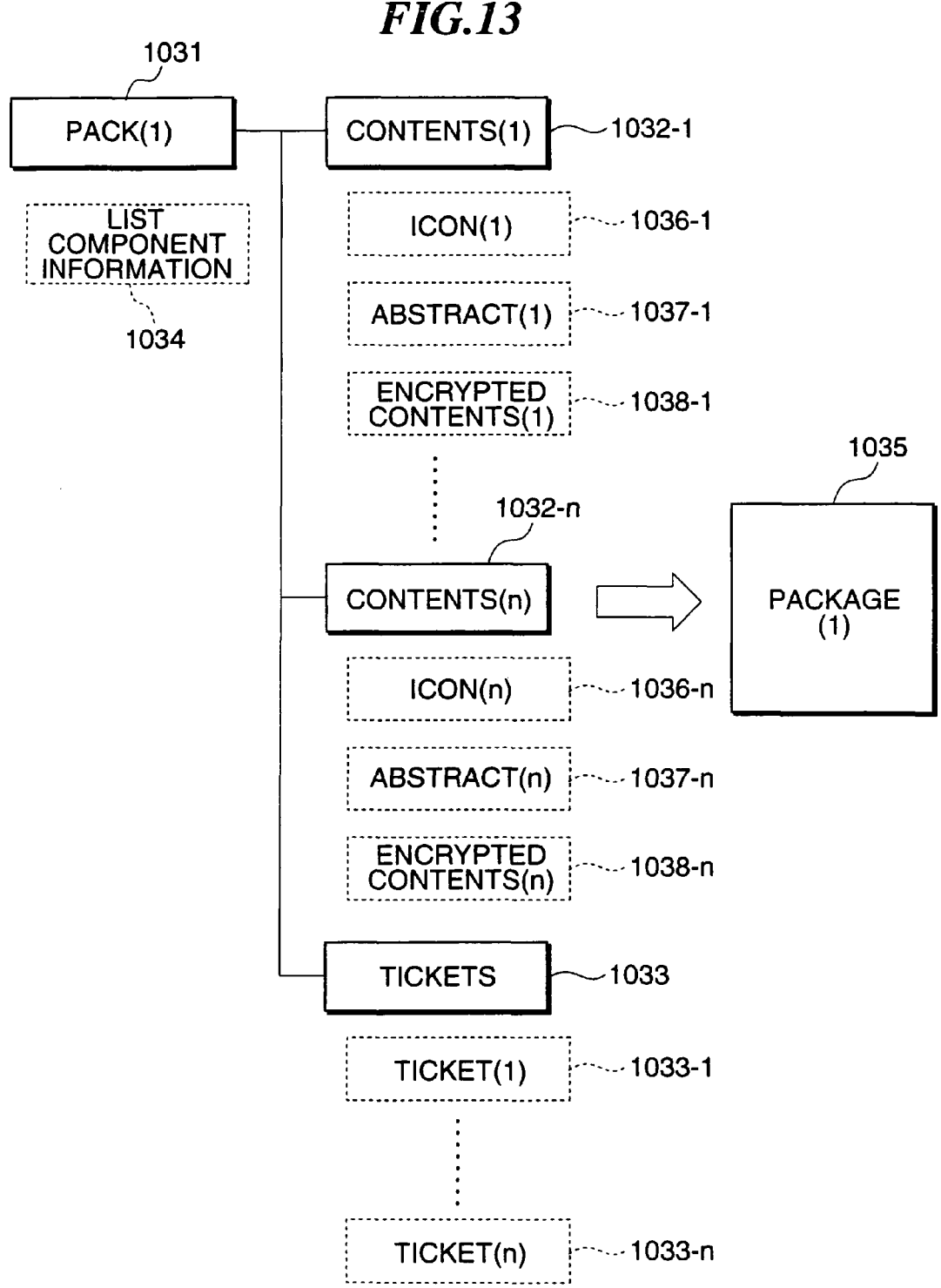
FIG. 13 is a diagram showing schematically the packing process of information contents.

FIG. 11 shows by block diagram still another example of the configuration of the content distribution/delivery system 1000 based on the second embodiment of the present invention. The distribution/delivery system 1000 includes content suppliers 1000-1, 1000-2 . . . , a distribution service provider 1002, user terminals 1004-1, 1004-2 . . . , and a center station 1005. This system configuration differs from the previous examples of FIG. 9 and FIG. 10 in that the user terminals 1004 . . . are connected to the distribution service provider 1002 through conventional distribution routes of publications such as CDs and magazines. The user terminals 1004 . . . are bidirectionally connected to the center station 1005 by a transmission medium 1007 (same as above).

In the example shown in FIG. 11, the content suppliers 1001 . . . create and supply digital information contents or computer-readable information contents including articles of newspapers and magazines, audio/video resources and computer programs.

The distribution service provider 1002 encrypts the contents supplied by the content suppliers 1001 . . . through the process of a predetermined encryption scheme, stores the resulting digital information contents and computer-readable information contents on portable storage mediums such as CD-Rs and MOs, and distributes the recorded contents throughout the market by using the commodity distribution routes 1006c. The portable storage mediums are distributed by being attached to magazines and other publications and also retailed on store shelves based on a predetermined distribution schedule.

The user terminals 1004 are terminal devices which provide, at a fee, the utility for the use of information contents received in the form of data transmission, and these terminals are installed in open spaces such as convenience stores and cooperatives on campuses for example (same as above). The use of contents mentioned here signifies the printout on the print paper and storing on storage mediums, and the user terminal 1004 is equivalent to the recording service system 100 described in the first embodiment.

In the example shown in FIG. 11, the user terminals 1004 . . . provide the utility for the use of information contents in the form of records on portable storage mediums.

The center station 1005 collects and totalizes charging data from the user terminals 1004 . . . through the transmission medium 1007 and administers the fee information about the information content supply.

The following explains the details of the content supplier 1001, distribution service provider 1002, user terminal 1004 and center station 1005 which constitute in unison the content distribution/delivery system 1000.

[1] Content Supplier

The content supplier 1001 is a content creator and supplier who provides fee-charging or free digital information contents or computer-readable information contents including articles of newspapers and magazines, audio/video resources and computer programs. In some cases, the content supplier 1001 pays the content registration commission depending on the volume of contents used by users.

In the foregoing examples of system configuration, the content supplier 1001-1 is a publisher M and the content supplier 1001-2 is a newspaper agent N. These M and N supply computer-readable information contents derived from various mediums such as books, magazines, newspaper articles, and audio/video resources and computer programs.

[2] Distribution Service Provider

The distribution service provider 1002 receives information contents from the content suppliers 1001 . . . , and produces content-related information including icon files and abstract articles of the contents. The provider encrypts the information contents and produces and issues tickets for the encrypted information contents.

There are two types of ticket: user-signed ticket 1010 and user-unsigned ticket 1020 as shown in FIGS. 12A and 12B. The signed ticket 1010 has data fields of decryption key information 1011, content ID 1012, supplier ID 1013, point/page 1014, and number of pages 1015. The unsigned ticket 1020 has data fields of decryption key information 1021, content ID 1022, supplier ID 1023, point/page 1024, and number of pages 1025.

The signed ticket 1010 has its decryption key information 1011 customized to a specific user, whereas the unsigned ticket 1020 has its decryption key information 1021 made effective for all users. For example, in the case where a signed ticket 1010 is issued to user A (user terminal 1004-1) so that content N1 supplied by the newspaper agent N (content supplier 1001-2) is used only by this user, the decryption key for decrypting the content N1 is calculated from the decryption key information 1011 and special information (to be explained later) held by the user A. In the case where unsigned tickets 1020 are issued so that contents Ml supplied by the publisher M (content supplier 1001-1) are usable for all users (user A (user terminal 1004-1) user B (user terminal 1004-2), user C (user terminal 1004-3) . . . in the examples of FIGS. 9, 10 and 11), the decryption key for decrypting the content Ml is calculated from the decryption key information 1021 or common information (to be explained later) shared by these users.

The distribution service provider 1002, who has issued the tickets, produces content list information and packs each content, content-related information, content list information and a ticket. For example, the provider 1002 packs content (1)

folder 1032-1 through content (n) folder 1032-*n* and a ticket folder 1033 into Pack (1) folder 1031, and assembles the Pack and list component information 1034 into package (1) 1035. The content (1) folder 1032-1 contains icon (1) 1036-1 and abstract (1) 1037-1 as content-related information and encrypted content (1) 1038-1 as content body. The ticket folder 1033 contains ticket (1) 1039-1 through ticket (n) 1039-*n*.

Subsequently, the distribution service provider 1002 distributes and delivers the resulting packages to the users (user terminals 1004-1, 1004-2, 1004-3 . . . ) in accordance with a predetermined distribution schedule. The present invention is not concerned in the form of content distribution and delivery. For example, the packages (packed contents) may be broadcast by using the data broadcasting facility (refer to FIG. 9), push-distributed or pull-distributed through the LAN or Internet (refer to FIG. 10), or distributed by being recorded on portable storage mediums such as CD-ROMs and MOs and attached to books, magazines and other publications (refer to FIG. 11).

The distribution service provider 1002 may possibly works solely to distribute or deliver information contents. In this case, the above-mentioned packing task is done by the content suppliers 1001 . . . .

[3] User Terminal

Next, the user terminals 1004 (1004-1, 1004-2, 1004-3 . . . ) will be explained.

Figure 14:
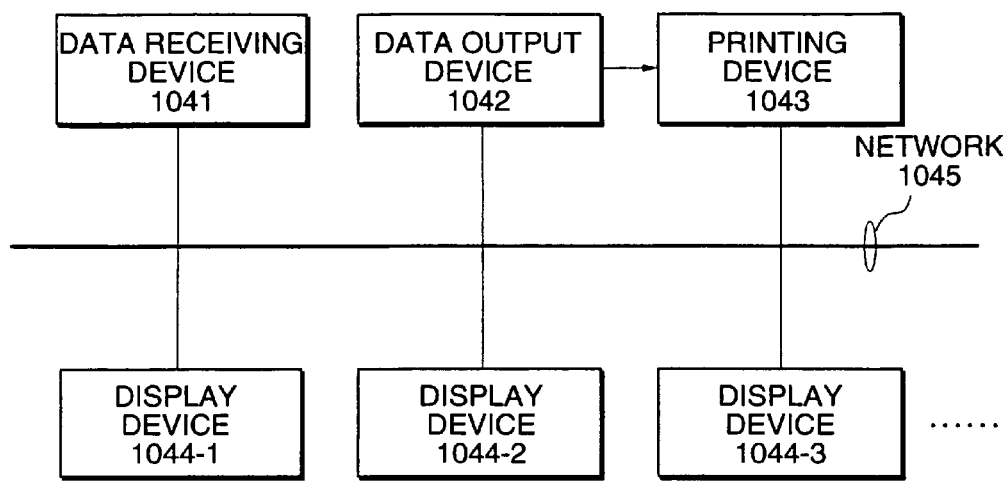
FIG. 14 is a block diagram showing schematically the configuration of the user terminal 1004.

FIG. 14 shows by block diagram the configuration of the user terminal 1004. It includes a data receiving device 1041, a data output device 1042, a printing device 1043, and display devices 1044-1, 1044-2, 1044-3 . . . . These devices are connected with each other via a network 1045 such as a LAN or the Internet. The devices 1041, 1042 and 1044 are host terminals in the network, and they can be personal computer systems compatible with the IBM's PC/AT and its successors (mentioned earlier).

The data receiving device 1041 is a device which receives packages of contents distributed and delivered by the distribution service provider 1002. The user terminal 1004 may be equipped with a medium reader/writer (not shown) for reading and writing content data on a portable storage medium in addition to (or in place of) the data receiving device 1041.

The data output device 1042 acquires the contents received by the data receiving device 1041, and outputs the contents in accordance with the user's request.

The printing device 1043 prints out the contents in accordance with the user's request, and it also works as print server for dealing with print requests coming via the network 1045. Each display device 1044 displays contents in accordance with the user's request, and it is a Web client, for example.

Next, the details of the user terminal 1004 will be explained.

[3-1] Data Receiving Device

Figure 15:
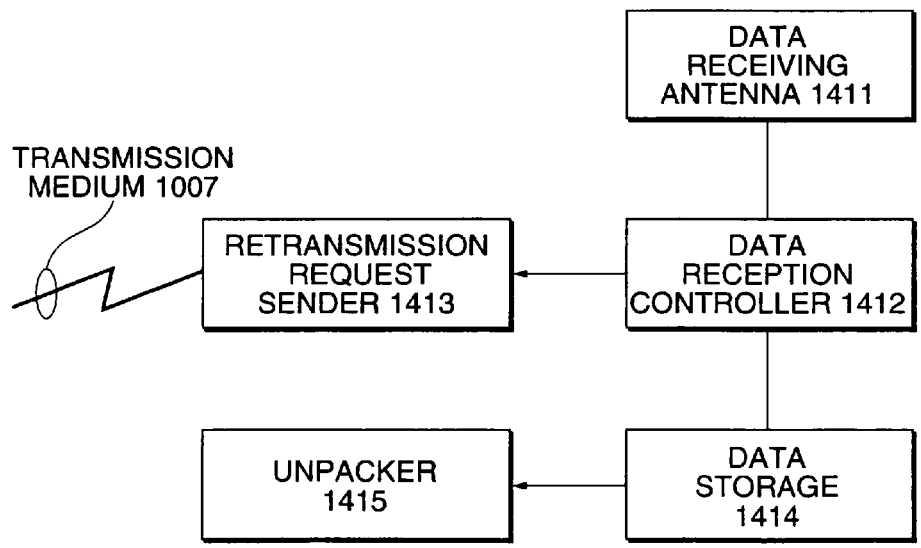
FIG. 15 is a block diagram showing schematically the configuration of the data receiving device 1041.

FIG. 15 shows by block diagram the configuration of the data receiving device 1041.

The data receiving device 1041 is made up of a data receiving antenna 1411, a data reception controller 1412, a retransmission request sender 1413, a data storage 1414, and an unpacker 1415. The data receiving device 1041 may be equipped with a medium reader/writer (not shown) for reading and writing content data on a portable storage medium.

The data receiving antenna 1411 receives distributed or delivered packages of data, and the data reception controller 1412 controls the data reception. The retransmission request sender 1413 operates at the occurrence of reception error to request the retransmission of data to the distribution service provider 1002 via a transmission medium 1007 such as the public telephone line (PSTN or ISDN). The data storage 1414 stores received packages, and the unpacker 1415 unpacks the packages stored in the data storage 1414. The storage 1414 also stores contents unpacked from the packages received and stored.

Figure 16:
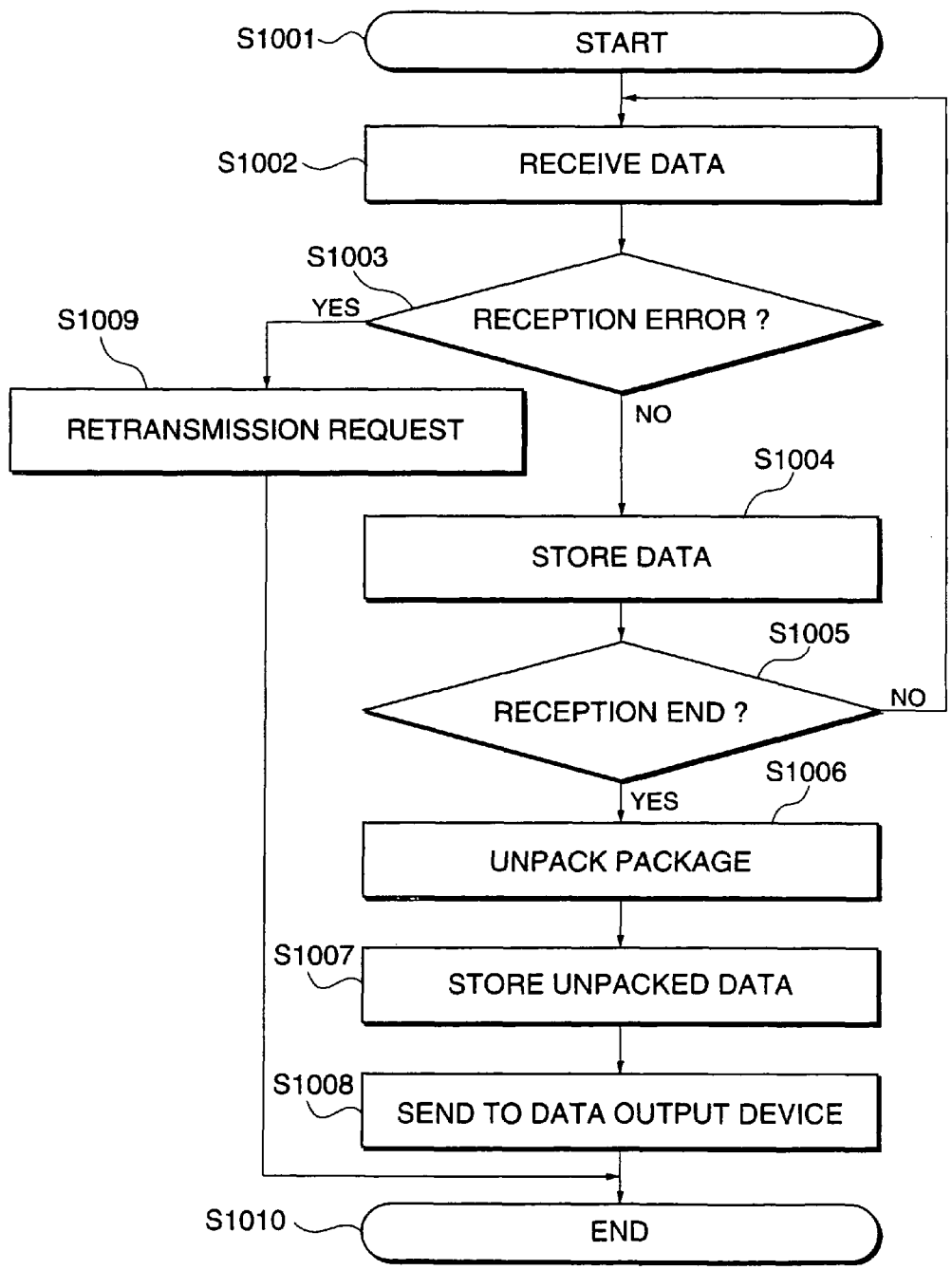
FIG. 16 is a flowchart showing the processing procedure of the data receiving device 1041.

FIG. 16 explains by flowchart the processing procedure of the data receiving device 1041. Each step of the flowchart will be explained.

The data receiving device 1041 starts (step S1001), and the data receiving antenna 1411 receives packages of contents delivered by the distribution service provider 1002 (step S1002). The data reception controller 1412 stores the received packages in the data storage 1414 unless reception error arises ("no" at step S1003), and repeats the operation (steps S1002 to S1004) until the end of data reception ("no" at step S1005).

On completion of data reception ("yes" at step S1005), the unpacker 1415 unpacks the packages stored in the data storage 1414 into contents (step S1006), and stores the unpacked contents in the data storage 1414 (step S1007). The contents stored in the data storage 1414 are transferred to the data output device 1042 (step S1008), and the process of the data receiving device 1041 terminates (step S1010).

At the occurrence of a reception error in the packages received by the data receiving antenna 1411 ("yes" at step S1003), the retransmission request sender 1413 requests the retransmission of data to the distribution service provider 1002 via the transmission medium 1007: (step S1009), and the process terminates (step S1010).

Figure 17:
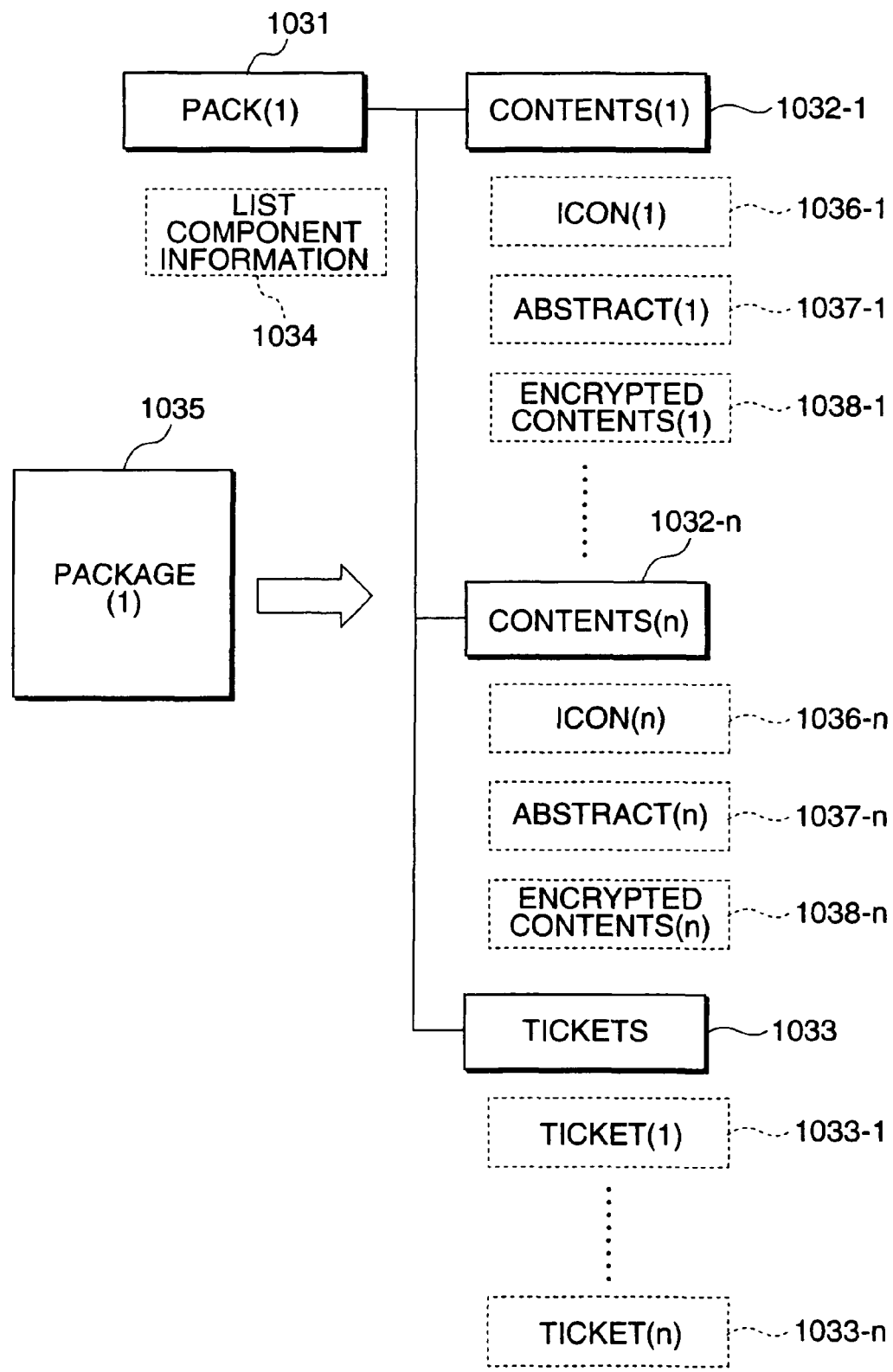
FIG. 17 is a diagram used to explain the unpacking of package.

In the unpacking process of step S1006 by the unpacker 1415, the package (1) 1035 is broken into the list component information 1034 and Pack (1) folder 1031 as shown in FIG. 17. The Pack (1) folder 1031 contains content (1) folder 1032-1 through content (n) folder 1032-*n* and a ticket folder 1033, the content (1) folder 1032-1 contains icon (1) 1036-1 and abstract (1) 1037-1 as content-related information and encrypted content (1) 1038-1 as content body, and the ticket folder 1033 contains ticket (1) 1039-1 through ticket (n) 1039-*n*.

[3-2] Data Output Device

Figure 18:
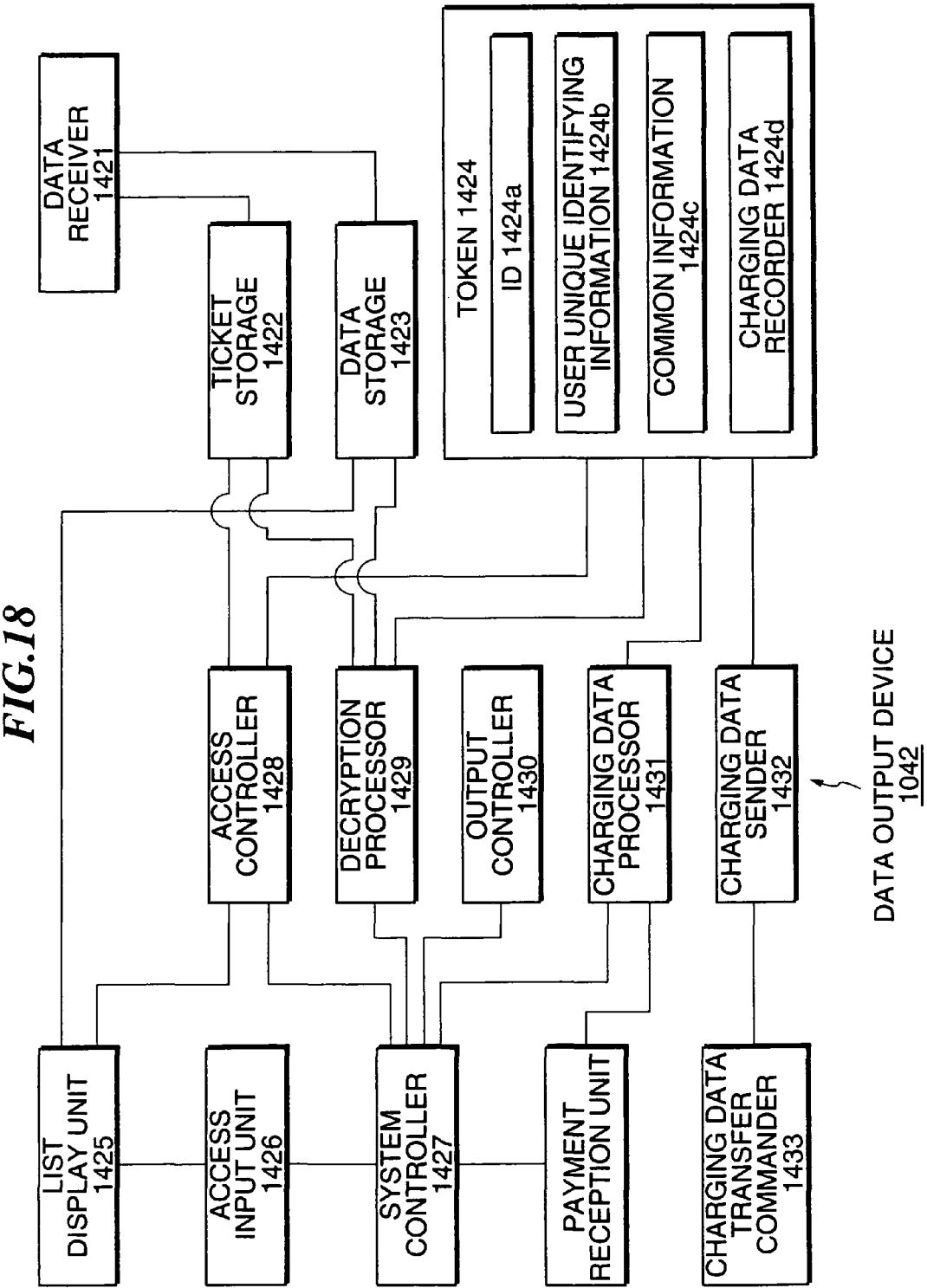
FIG. 18 is a block diagram showing the processing procedure of the data output device 1042.

FIG. 18 shows by block diagram the configuration of the data output device 1042.

The data output device 1042 is made up of a data receiver 1421, a ticket storage 1422, a data storage 1423, a token 1424, a list display unit 1425, an access input unit 1426, a system controller 1427, an access controller 1428, a decryption processor 1429, an output controller 1430, a charging data processor 1431, a charging data sender 1432, and a charging data transfer commander 1433.

The data receiver 1421 receives data from the data receiving device 1041. The ticket storage 1422 stores the tickets 1039 (1039-1 through 1039-*n*: refer to FIG. 17) out of the data received by the data receiver 1421. The data storage 1423 stores the list component information 1034 and content folders 1032 (content (1) folder 1032-1 through content (n) folder 1032-*n*).

The token 1424 stores the ID record 1424*a*, user unique identifying information 1424*b*, common information 1424*c* and charging data recorder 1424*d*, and it is an IC card for example.

The list display unit 1425 displays the list of contents on the screen (not shown) in accordance with the list component information 1034 read out of the data storage 1423. The access input unit 1426 is the interface used by the user for specifying the intended content and output information (paper size, number of faces for N-up printing, number of pages, etc.) in accordance with the list displayed by the list display unit 1425, and it is a touch-panel or the like. The system controller 1427 operates on the units of the data output device 1042 to implement the access control, content decrypting process and charging data processing. In the case where a personal computer (PC) or the like is used for the data output device 1042, the access input unit 1426 can be substituted by the standard user input device such as the keyboard or mouse device of the computer. Otherwise, in the case where an operation panel such as the touch-panel is provided on the printing device 1043, it can be used for the access input unit 1426.

The access controller 1428 verifies the access to the encrypted content 1038 stored in the data storage 1423 based on the information stored in the token 1424 and the decryption key information on the ticket. The decryption processor 1429 decrypts the encrypted content 1038 based on the data on the ticket 1039 in the ticket storage 1422 and user unique identifying information 1424b or common information 1424 in the token 1424.

The output controller 1430 feeds the decrypted content from the decryption processor 1429 to the printing device 1043 in accordance with the output information provided by the access input unit 1426. The charging data processor 1431 operates after the output of content to acquire charging data from the related units and put it in the charging data recorder 1424d in the token 1424. The charging data is indicated to the user by being displayed on the screen, printed on a bill, or by audio-output. The payment receiver receives the payment from the user. The payment receiver is specifically a coin box or cash dispenser. Part or all of fee to be charged to the user may possibly be made up with a content registration commission paid by the content supplier.

Although the charging data recorder 1424d is disposed in the token 1424 in this embodiment, it may be stored in an external storage device such as a hard disk (not shown) provided to the user terminal 1004.

The charging data sender 1432 sends the charging data retrieved from the charging data recorder 1424d to the center station 1005 via the transmission medium 1007 such as a public telephone line. Otherwise, the charging data stored on a portable storage medium such as an IC card, floppy disk or token may be sent by mail. The charging data transfer commander 1433 directs the charging data sender 1432 to send the charging data in accordance with the predetermined schedule.

Figure 19:
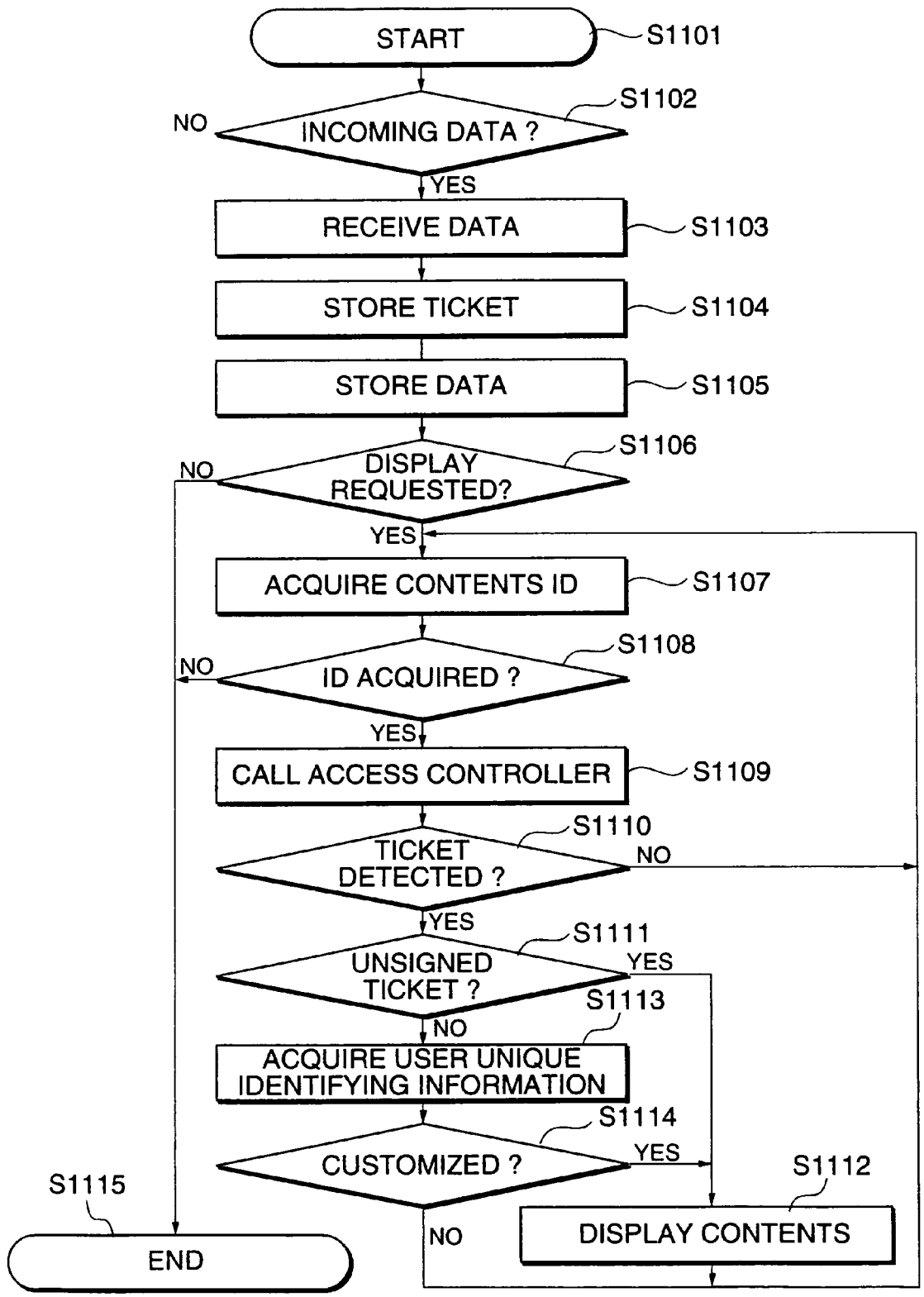
FIG. 19 is a flowchart showing the processing procedure of the display of a content list.

The list display process will be explained with reference to the flowchart of FIG. 19. The list display unit 1425 selects a list of contents which can be displayed depending on the presence or absence of the ticket in the ticket storage 1422.

The list display starts (step S1101), and if there is data transfer from the data receiving device 1041 ("yes" at step S1102), the data receiver 1421 receives the data (step S1103), stores the tickets 1039 (1039-1 through 1039-n) in the ticket folder 1033 out of the received data (step S1104), and stores the icon 1036 and abstract 1037 in the content folders 1032, encrypted content 1038, and list component information 1034 in the data storage 1423 (step S1105). In response to a subsequent request of list display from the access input unit 1426 ("yes" at step S1106), the list display unit 1425 acquires the content ID to be displayed from the list component information 1034 (step S1107).

In the case of the successful acquisition of content ID ("yes" at step S1108), the list display unit 1425 directs the access controller 1428 to detect the presence or absence of the ticket for the obtained content ID (step S1109). The access controller 1428 inquires of the ticket storage 1422 as to whether it has the ticket for the content ID (step S1110).

If the ticket is present in the ticket storage 1422 ("yes" at step S1110), and if the ticket is an unsigned ticket 1020 ("yes" at step S1111), the ticket storage 1422 informs the list display unit 1425 that the content list can be displayed, then the content list display unit 1425 displays the content list.

If the ticket in the ticket storage 1422 is not an unsigned ticket 1020, i.e., it is a signed ticket 1010, ("no" at step S1111), the access controller 1428 acquires the user unique identifying information 1424b from the token 1424 and analyzes as to whether or not the decryption key information 1011 of the signed ticket 1010 is customized to the user unique identifying information 1424b (step S1113). In the case of the decryption key information 1011 customized to the user unique identifying information 1424b ("yes" at step S1114), it is informed to the list display unit 1425 that the content can be displayed in the list, then the list display unit 1425 displays the content list (step S1112). Otherwise ("no" at step S1114), the list display unit 1425 skips the display and retrieves the next content ID from the list component information 1034 (step S1107).

The process of step S1107 and subsequent steps is repeated at each successful retrieval of content ID ("yes" at step S1108), and the list display process terminates when the retrieval of content ID fails, i.e., when the processes for all content IDs complete ("no" at step S1108) (step S1115).

At the list display, the icon 1036 and abstract 1037 retrieved from the data storage 1423 are displayed on request of the user. The user points the icon 1036 by using the touch-panel, mouse device or keyboard to select the content. The user uses the abstract 1037 as a reference for checking the content and selecting intended pages.

Figure 20:
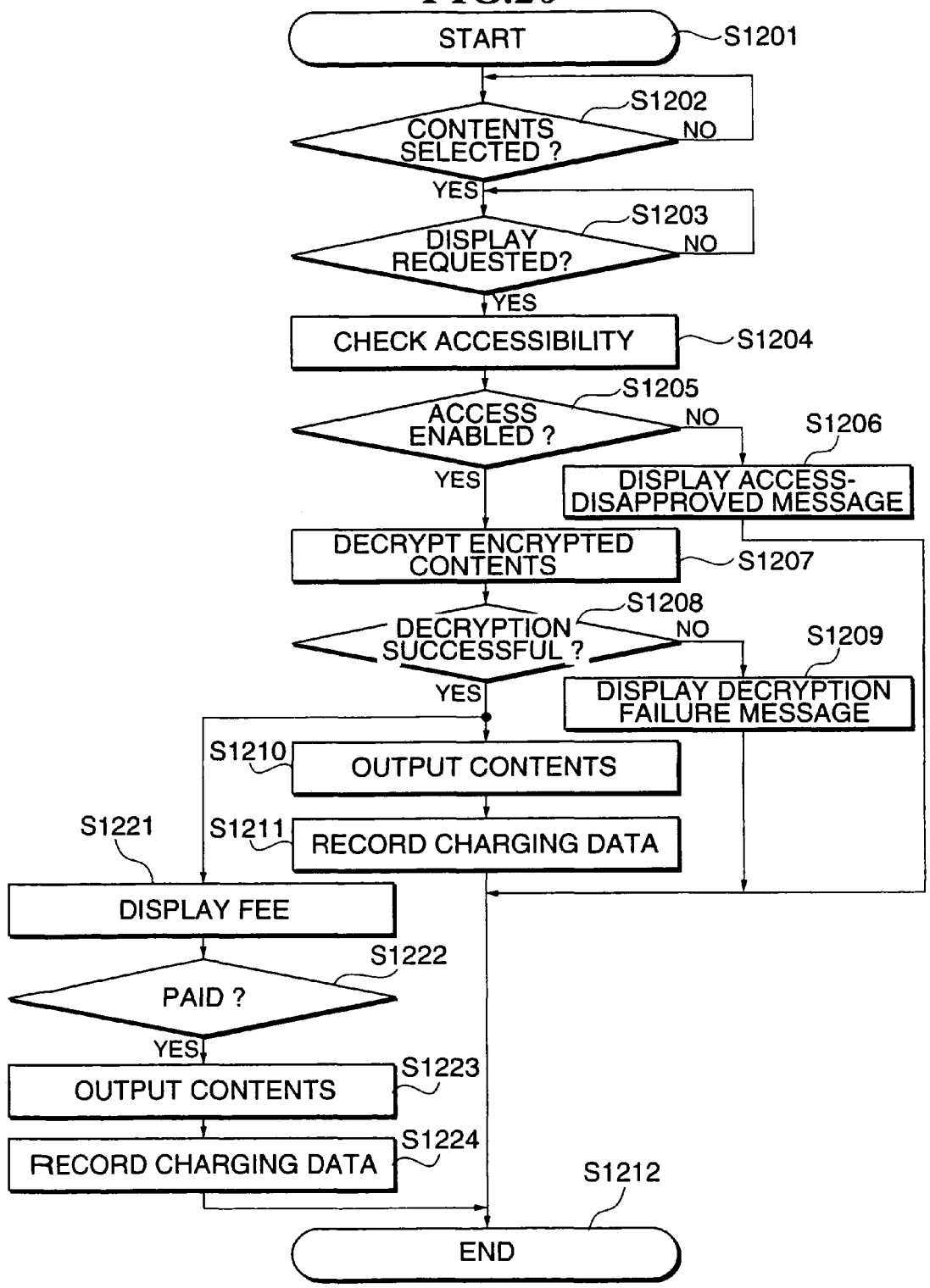
FIG. 20 is a flowchart showing the processing procedure of the output of content.

Next, the content output process will be explained. FIG. 20 shows the processing steps to output contents in flowchart. Each step of the flowchart will be explained.

The content output process starts in response to the entry of a content output request from the access input unit 1426 (step S1201). When the user selects a content through the access input unit 1426 ("yes" at step S1202) and enters output information ("yes" at step S1203), the access controller 1428 checks the relevancy of access to the selected content, i.e., the presence and legitimacy of the token 1424 and whether the ticket 1039 for the selected content has been stored in the ticket storage 1422 (step S1204).

If the access to the content is disabled as a result of verification, ("no" at step S1205), the system controller 1427 displays an access disapproval message on the display screen (step S1205), and the content output process terminates (step S1212). The access disapproval message may be indicated to the user in a manner other than the display on the screen.

If the content access is enabled as a result of checking ("yes" at step S1205), the decryption processor 1429 produces a decryption key based on the ticket 1039 for the selected content and information in the token 1424 (the user unique identifying information 1424b in the case of the signed ticket or the common information 1424c in the case of the unsigned ticket) (step S1207) and decrypts the encrypted content 1038 (step S1207).

If the decryption process fails ("no" at step S1208), the system controller 1427 displays a message of decryption failure on the display screen (step S1209) and the content output process terminates (step S1212). The decryption failure information may be indicated to the user in a manner other than the display on the screen.

Following the successful decryption process ("yes" at step S1208), the output controller 1430 feeds the decrypted content to the printing device 1043 in accordance with the output information (step S1210). The charging data processor 1431 produces the charging data based on the ticket 1039, encrypted content 1038, output information and output result, and puts the produced information in the charging data recorder 1424d (step 1211). The content output process terminates (step S1212).

In case the data output device 1042 has such a payment reception unit as a coin box, it indicates the amount of fee to the user (step S1221) in response to the successful decryption process ("yes" at step S1208). The manner of fee amount indication may be any of display on the screen, printing on a bill or audio output. Part or all of fee to be charged to the user may possibly be made up with a content registration commission paid by the content supplier.

When the fee is paid ("yes" at step S1222), the output controller 1430 feeds the decrypted content to the printing device 1043 in accordance with the output information (step S1223). The charging data processor 1431 produces the charging data based on the ticket 1039, encrypted content 1038, output information and output result, and puts the produced information in the charging data recorder 1424d (step S1224). The content output process terminates (step S1212).

In this manner, the charging data is produced only at the successful content output. It is not produced in the event of decryption failure, and therefore the user is not charged. In the case of failure in the printing process following the successful decryption, only printout pages of the content are charged.

The charging data includes items of ID, content ID, supplier ID, date/time, number of content pages, number of printout pages, number of faces for N-up printing and paper size, point per page, user ID, and ending status, as shown in FIG. 21.

The ID is to identify the fee issued by the charging data processor 1431. The content ID is the ID of the content used, and it is retrieved from the ticket 1039. The supplier ID is the ID held by the content supplier 1001 who has supplied the content used, and it is retrieved from the ticket 1039. The date/time is date and time when the content is used, and it is issued by the system controller 1427. The number of content pages is the number of pages of content requested to output, and it is retrieved from the ticket 1039. The number of printout pages is the number of prints produced by the printing device 1043, and it is indicated by the output controller 1430. The N-up and paper size are the number of pages printed on a sheet of paper (number of logical pages), print paper size and paper layout direction, and it is indicated by the output controller 1430. The point per page is the number of points per page or the price per page, and it is retrieved from the ticket 1039. The user ID is the ID held by the user who has used the content, and it is retrieved from the ID record 1424a of the token 1424. The ending status is the output result of the output controller 1430, and it is indicated by the system controller 1427. In the case of abnormal output of the output controller 1430, the ending status includes error information.

The charging data having these items is, as shown in FIG. 22, accumulated at every content output as multiple pieces of charging data, put into the charging data recorder 1424d, and sent to the center station 1005 in accordance with a predetermined schedule. The charging data, which can possibly be tampered with, may desirably be secured by appending a digital signature to it.

[3-3] Printing Device

The printing device 1043 may be a conventional printer, or a multifunction machine having multiple functions of printer, copy machine, facsimile, etc. mentioned previously.

[3-4] Display Device

The display device 1044 (1044-1, 1044-2, 1044-3 . . . ) is a host terminal connected to the network, and it is built as a general-purpose computer system called work station and personal computer. An example of such computer system is a personal computer compatible with IBM's PC/AT and its successor (mentioned earlier).

Figure 23:
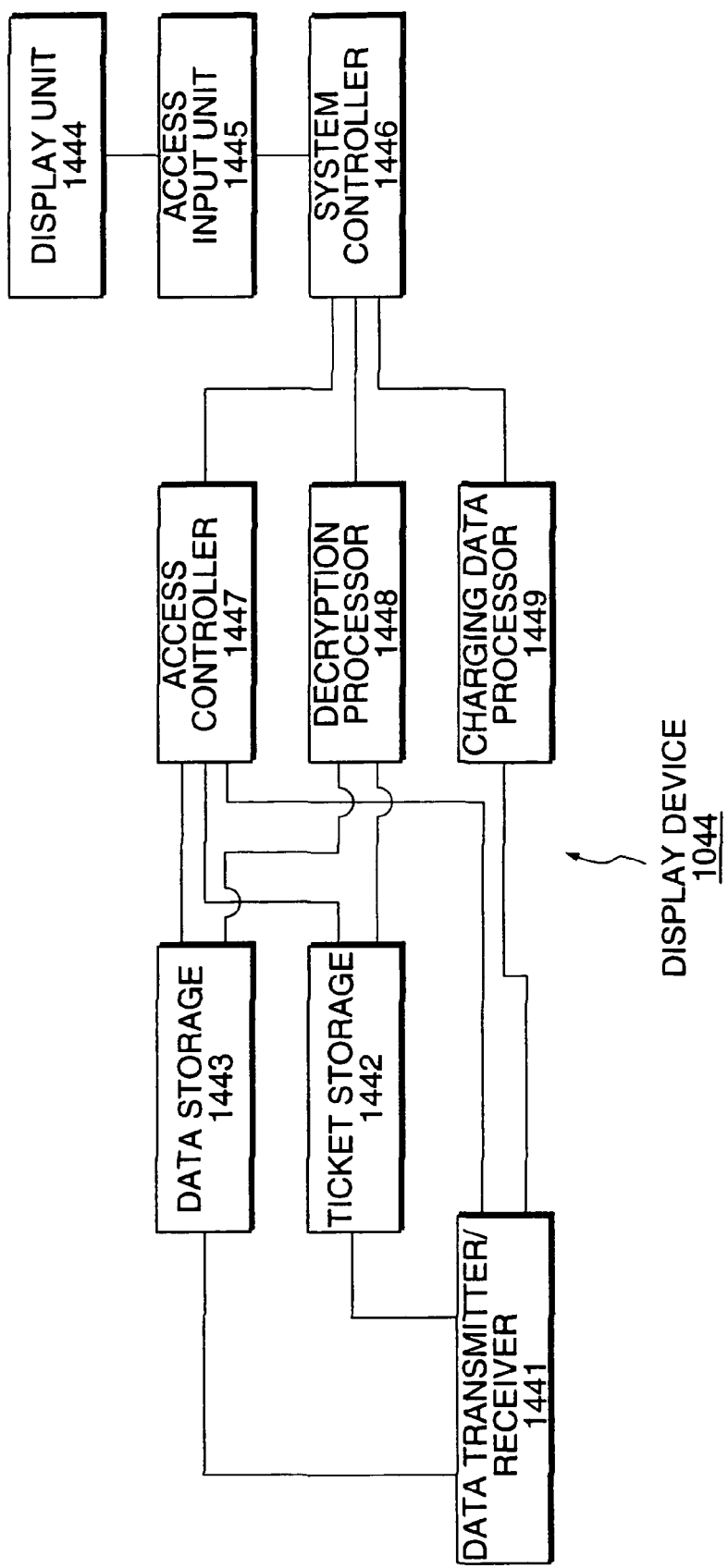
FIG. 23 is a block diagram showing schematically the functional configuration of the display device 1044.

FIG. 23 shows by block diagram the functional configuration of the display device 1044. The display device 1044 is made up of a data transmitter/receiver 1441, a ticket storage 1442, a data storage 1443, a display unit 1444, an access input unit 1445, a system controller 1446, an access controller 1447, a decryption processor 1448, and a charging data processor 1449.

The data transmit-receiver 1441 is connected to the data receiving device 1041 and data output device 1042 through the network 1045, and it receives data from the data receiving device 1041 and transacts data with the data output device 1042.

The ticket storage 1442 stores tickets 1039 (1039-1 through 1039-n: refer to FIG. 17) out of the data received by the data transmitter/receiver 1441. The data storage 1443 stores the list component information 1034 and content folders 1032 (content (1) folder 1032-1 through content (n) folder 1032-n).

The display unit 1444 displays the list of contents on the display screen (not shown) in accordance with the list component information 1034 stored in the data storage 1443, and it also displays the content itself.

The access input unit 1445 is a user interface used by the user to enter an intended content and its output information (paper size, N-up, number of pages, etc.) in accordance with the content list displayed on the display unit 1444, and it is a touch-panel for example.

The system controller 1446 controls the operation of the entire display device 1044 to implement the access control, decryption process for the encrypted content and charging data processing.

The access controller 1447 verifies the accessibility to the encrypted content 1038 stored in the data storage 1443 in accordance with the information stored in the token 1424 of the data output device 1042.

The decryption processor 1448 decrypts the encrypted content 1038 based on the ticket 1039 stored in the ticket storage 1442 and user unique identifying information 1424b or common information 1424c in the token 1424.

The charging data processor 1449 acquires charging data from the related units after the use of the content, and puts it into the charging data recorder 1424d in the token 1424.

Figure 24:
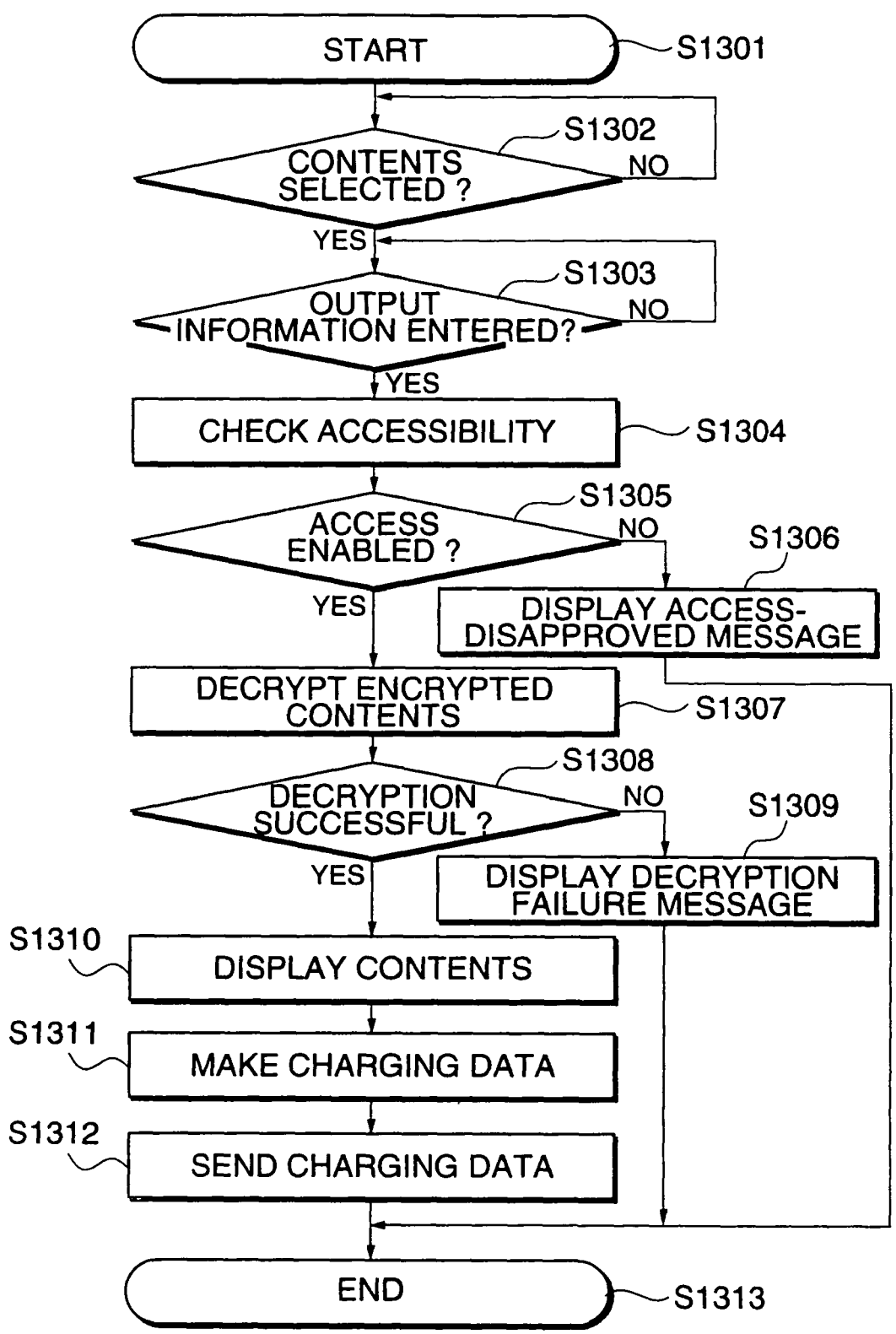
FIG. 24 is a flowchart showing the processing procedure of the display of content.

The content display process will be explained. FIG. 24 shows the processing steps to indicate contents in flowchart. Each step of the flowchart will be explained.

The content display process starts in response to the entry of a content display request from the access input unit 1445 (step S1301). The user selects a content through the access input unit 1445 ("yes" at step S1302). The access controller 1447 checks the presence and legitimacy of the token 1424 and the relevancy of access to the selected content (step S1304). The verification of access to the selected content includes checking whether the storage of the ticket 1039 for the selected content has been stored in the ticket storage 1442 and whether the ticket 1039 has not been tampered with.

If the access to the content is disabled as a result of checking ("no" at step S1303), the system controller 1446 displays an access disapproval message on the display unit 1444 (step S1306), and the content display process terminates (step S1313). The access disapproval message can be indicated in an arbitrary manner.

If the content access is enabled as a result of checking ("yes" at step S1303), the decryption processor 1443 produces a decryption key based on the ticket 1039 for the selected content and the user unique identifying information 1424*b* (in the case of the signed ticket) or the common information 1424*c* (in the case of the unsigned ticket), and decrypts the encrypted content (step S1307).

If the decryption process fails ("no" at step S1308), the system controller 1446 displays the decryption failure information on the display unit 1444 (step S1309), and the content display process terminates (step S1313). The decryption failure information can be indicated in an arbitrary manner.

Following the successful decryption process ("yes" at step S1308), the system controller 1446 displays the decrypted content in accordance with the output information (step S1310). The charging data processor 1449 produces the charging data based on the ticket 1039, encrypted content 1038, output information and output result (step S1311), and sends the charging data to the data output device 1042 through the data transmitter/receiver 1441 (step S1312). The content display process terminates (step S1313).

Figure 25:
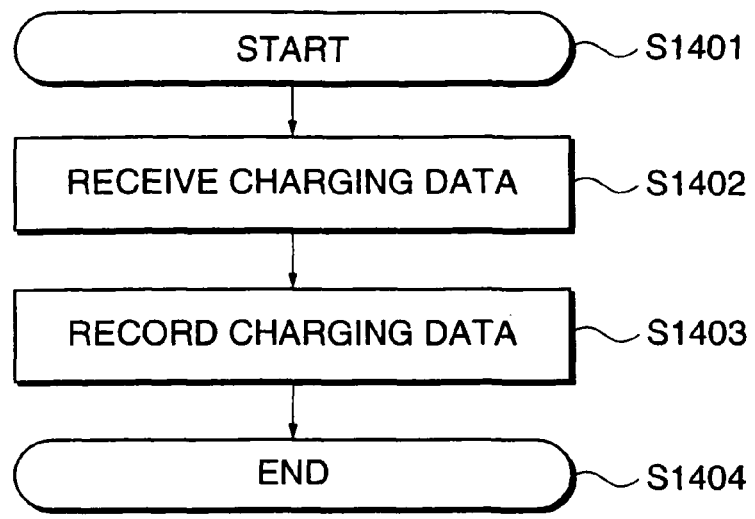
FIG. 25 is a flowchart showing the processing procedure for charging data implemented by the data output device 1042.

Next, processing steps of charging data will be explained, which are executed when contents are transferred from the display device 1044 to the data output device 1042. FIG. 25 shows in flowchart the processing steps of charging data to be performed in the data output device 1042.

The data output device 1042 starts processing (step S1401). When it receives charging data from the display device 1044 (step S1402), the system controller 1427 instructs the charging data processor 1431 to record the charging data, then the charging data processing unit 1431 records the received charging data in the charging data recorder 1424*d* (step S1403), and the charging data processing terminates (step S1404).

The payment receiver (mentioned earlier) receives payment from the user in accordance with the received charging data. The payment method is arbitrary. For example, in addition to use of coins and bank notes, insertion of a prepaid card, on-the-spot direct drawing with a debit card, and credit settlement using a credit card are acceptable. In some cases part or all of the payment to be charged to the user can be made up by the content supplier 1001 as a content registration commission.

As described above, display devices 1044-1, 1044-2 ... can decrypt the encrypted contents and display them. Accordingly, since contents are network-transferred after being encrypted, it is possible to suitably prevent illegal copying and tampering with information contents as well as to technically protect copyrights of the contents.

[4] Center Station

Next, the center station 1005 will be explained.

Figure 26:
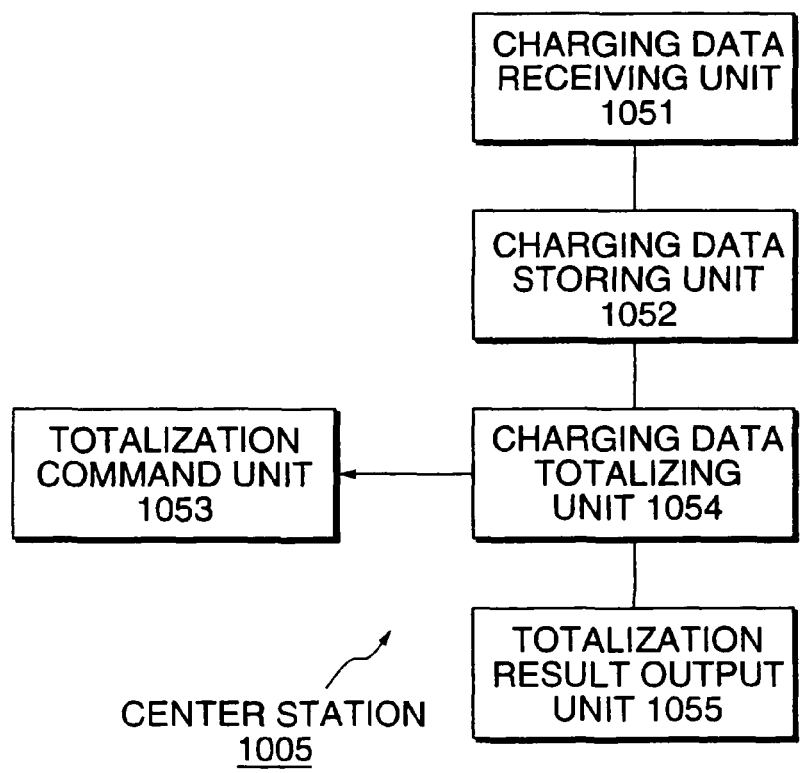
FIG. 26 is a block diagram showing schematically the functional configuration of the center station 1005.

FIG. 26 is a block diagram schematically showing the functional configuration of the center station 1005. The center station 1005 is made up of a charging data receiving unit 1051, a charging data storing unit 1052, a totalization command unit 1053, a charging data totalizing unit 1054, and a totalization result output unit 1055.

The charging data receiving unit 1051 receives charging data which is sent from the data output device 1042 of each of all user terminals 1004-1 ... through the transmission medium 1007 such as a public telephone line. The charging data storing unit 1052 stores the charging data received by the reception unit 1051 by sorting the information in terms of the content user or content supplier 1001. The totalization command unit 1053 specifies charging data to be totalized, the destination of totalization result and the totalization format. The charging data totalizing unit 1054 totalizes the charging data stored in the charging data storing unit 1052 in accordance with the condition specified by the totalization command unit 1053. The totalization result output unit 1055 outputs the totalized charging data provided by the charging data totalizing unit 1054 in a file of a certain format and prints with a printer (not shown).

Figure 27:
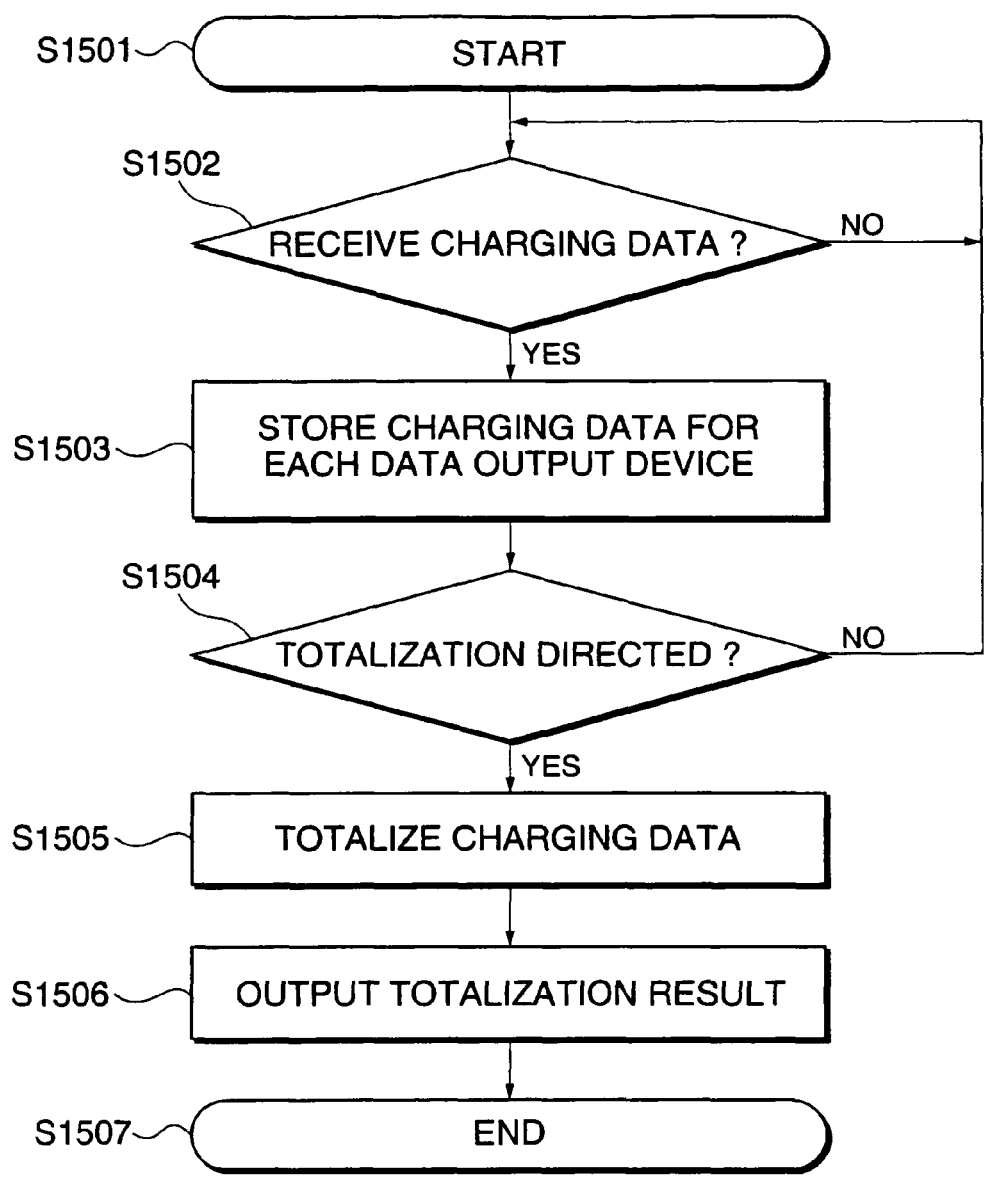
FIG. 27 is a flowchart showing the procedure of charging data totalizing process carried out by the center station 1005.

Next, the charging data totalizing process implemented by the center station 1005 will be explained. FIG. 27 is a flowchart showing the procedure of charging data totalizing process.

The center station 1005 starts the operation (step S1501). The charging data receiving unit 1051 receives the charging data ("yes" at step S1502), and stores the information in the charging data storing unit 1052 separately for individual users, i.e., individual data output units 1042 (step S1503). Otherwise, in the case where the charging data only includes the content registration commissions to be paid by the content suppliers, the charging data is totalized separately for individual content suppliers and stored in the charging data storing unit 1052.

The storing of charging data takes place at each reception of charging data until the time point set by the totalization command unit 1053 or until the entry of the instruction of totaling by the person in charge ("no" at step S1504).

The totalizing process starts at the time point set by the totalization command unit 1053 or at the entry of the instruction of totaling by the person in charge ("yes" at step S1504), the charging data totalizing unit 1054 totalizes the charging data stored in the charging data storing unit 1052 (step S1505), and the totalization result output unit 1055 outputs the totalization result (step S1506). The charging data totalizing process terminates (step S1507).

Next, the totalization result provided by the charging data totalizing unit 1054 will be explained specifically.

For totalizing charging data, the number of printout pages, number of faces for N-up printing, number of content pages, and point per page are retrieved from the charging data.

Subsequently, the number of content pages which have been used is calculated. If the number of printout pages multiplied by the number of faces for N-up printing, namely N, is greater than the number of content pages, the number of content pages used is set equal to the number of content pages, or otherwise if the number of printout pages multiplied by N is smaller than the number of content pages, the number of content pages used is set equal to the number of printout pages multiplied by N.

Subsequently, the points are calculated by multiplying the points per page by the number of content pages actually used.

As example 1, where the number of printout pages is 3, N is 2, number of content pages is 5, and points per page is 2, the number of content pages used is determined to be 5 (due to 3×2>5) and the points be 10 (2×5).

As example 2, where the number of printout pages is 3, N is 2, number of content pages is 6, and points per page is 2, the number of content pages used is determined to be 6 (due to 3×2=6) and the points be 12 (2×6).

As example 3, where the number of printout pages is 1, N is 2, number of content pages is 5, and points per page is 2, the number of content pages used is determined to be 2 (due to 1×2<3) and the points be 4 (2×2).

The totalized charging data is output as a file of a certain format or a printed matter as shown in FIG. 28 by the totalized data output unit 1055.

Although in the foregoing embodiment, the display devices 1044 are multiple host terminals connected to the data receiving device 1041 and data output device 1042 through a transmission medium such as the network 1045, the user terminal may include only one display device 1044. In this case, it is enough for the single display device to have local connection with the units 1041 and 1042 by cables, instead of the network 1045. Moreover, the display device 1044 and data output device 1042 can be implemented within one computer. In the case where information contents are distributed or delivered through the Internet or by a portable storage medium such as a CD-ROM (refer to FIG. 10 and FIG. 11), the data receiving device 1041 can also be implemented in the same computer. Some printer and copy machine used for the printing device 1043 transfer charging data over the public telephone line or the like, and these charging data transfer devices can be used to constitute this content distribution/delivery system 1000.

What is claimed is:

1. An information distributing system, comprising: a content distribution device,
    wherein the content distribution device issues a first signed ticket corresponding to a first content and a second unsigned ticket corresponding to a second content, and distributes the first signed ticket, the second un-signed ticket, an encrypted first content generated by encryption of the first content, and an encrypted second content generated by encryption of the second content,
    the first signed ticket including first decryption key information that is customized to a first user and that is used for decrypting the encrypted first content, and
    the second unsigned ticket including second decryption key information that is effective for any user including the first user and that is used for decrypting the encrypted second content; and a user terminal,
    wherein the user terminal includes:
        a receiving section that receives the first signed ticket, the second un-signed ticket, the encrypted first content, and the encrypted second content from the content distribution device through a network;
        a judging section that judges whether the encrypted first content is decrypted by using unique user information and the first decryption key information, the unique user information being acquired from a token provided to the user terminal by a user; and
        a controller that controls:
            (a) a display device to display first information, which represents the first content, on a screen, when the judging section judge that the encrypted first content is decrypted by using unique user information and the first decryption key information, so that the first user can designate the first information on the screen for outputting the first content,
            (b) the display device to not display the first information on the screen, when the judging section judges that the encrypted first content is not decrypted by using unique user information and the first decryption key information, and
            (c) the display device to display second information, which represents the second content, on the screen so that all the users can designate the second information on the screen for outputting the second content.

2. The information distributing system according to claim 1,
    wherein the token is an IC card, and the user terminal further comprises an acquiring section that acquires the unique user information from the IC card.

3. The information distributing system according to claim 1, further comprising:
    a decryption section that decrypts the encrypted first content; and
    an output control section that controls the first content decrypted by the decryption section to be output to a printer when the judging section judges that the encrypted first content is decrypted by using unique user information and the first decryption key information.

4. The information distributing system according to claim 1,
    wherein the first information and the second information includes at least one of an icon and an abstract that represents the first content and second content.

5. The information distributing system according to claim 1, the token further comprising an ID record, common information, and charging data recorder information.

6. The user terminal according to claim 1, the token further comprising an ID record, common information, and charging data recorder information.

7. A user terminal, comprising:
    a receiving section that receives, from a content distribution device through a network, a first signed ticket corresponding to a first content, a second un-signed ticket corresponding to a second content, an encrypted first content generated by encryption to the first content, and an encrypted second content generated by encryption to the second content,
    the first signed ticket including first decryption key information that is customized to a first user and that is used for decrypting the encrypted first content,
    the second un-signed ticket including second decryption key information that is effective for any user including the first user and that is used for decrypting the encrypted second content;
    a judging section that judges whether the encrypted first content is decrypted by using unique user information and the first decryption key information, the unique user information being acquired from a token provided to the user terminal by a user; and
    a controller that controls:
        (a) a display device to display first information, which represents the first content, on a screen, when the judging section judges that the encrypted first content is decrypted by using unique user information and the first decryption key information, so that the first user can designate the first information on the screen for outputting the first content,
        (b) the display device to not display the first information on the screen, when the judging section judges that the encrypted first content is not decrypted by using unique user information and the first decryption key information, and
        (c) the display device to display second information, which represents the second content, on the screen so that all the users can designate the second information on the screen for outputting the second content.

8. The user terminal according to claim 7,
    wherein the token is an IC card, and the user terminal further comprises acquiring section that acquires the unique user information from the IC card.

9. The user terminal according to claim 7, further comprising:
    a decryption section that decrypts the encrypted first content; and
    an output control section that controls the first content decrypted by the decryption section to be output to a printer when the judging section judges that the encrypted first content is decrypted by using unique user information and the first decryption key information.

10. The user terminal according to claim 7,
    wherein the first information and the second information includes at least one of an icon and an abstract that represents the first content and second content.

* * * * *